US012764741B2

(12) United States Patent
Zewail et al.

(10) Patent No.: US 12,764,741 B2
(45) **Date of Patent: *Oct. 13, 2026**

(54) UE ASSISTANCE IN PDSCH COLLISION AVOIDANCE WITH PRE-GRANTS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 677 days.

This patent is subject to a terminal disclaimer.

(21) Appl. No.: 18/183,935

(22) Filed: Mar. 14, 2023

(65) Prior Publication Data

US 2024/0314778 A1 Sep. 19, 2024

(51) Int. Cl.
*H04W 72/1273* (2023.01)

(52) U.S. Cl.
CPC ............................... *H04W 72/1273* (2013.01)

(58) Field of Classification Search
CPC .............. H04W 72/1273; H04W 72/23; H04L 1/1854; H04L 1/1864; H04L 1/1896; H04L 5/0044; H04L 5/0053; H04L 5/0055
See application file for complete search history.

(56) References Cited

U.S. PATENT DOCUMENTS

| | | | | |
|---|---|---|---|---|
| 2022/0182957 | A1* | 6/2022 | Laddu | H04L 5/0094 |
| 2022/0217760 | A1 | 7/2022 | Iyer et al. | |
| 2022/0272743 | A1 | 8/2022 | Cirik et al. | |
| 2023/0217450 | A1* | 7/2023 | He | H04L 5/0094 370/329 |
| 2023/0292303 | A1* | 9/2023 | Deghel | H04L 5/0055 |
| 2024/0040582 | A1* | 2/2024 | He | H04L 1/1854 |
| 2024/0314742 | A1* | 9/2024 | Zewail | H04W 72/1263 |
| 2025/0220680 | A1* | 7/2025 | Saber | H04W 24/10 |

OTHER PUBLICATIONS

International Search Report and Written Opinion—PCT/US2024/018931—ISA/EPO—Jun. 20, 2024.

* cited by examiner

*Primary Examiner* — Sharmin Chowdhury
(74) *Attorney, Agent, or Firm* — QUALCOMM Incorporated

(57) ABSTRACT

The apparatus may be associated with at least a first TRP (or wireless device) and may be configured to transmit (or receive) a first indication indicating a potential grant of resources for a downlink (DL) transmission for at least one wireless device. The apparatus may further be configured to receive (or transmit) a feedback indicating that the potential grant of the resources is accepted by a wireless device of the at least one wireless device. The apparatus may also be configured to transmit (or receive) at least one of a second indication indicating a grant of the resources for the DL transmission for the wireless device of the at least one wireless device, or the DL transmission via the resources indicated in the first indication or the second indication.

30 Claims, 17 Drawing Sheets

UE ASSISTANCE IN PDSCH COLLISION AVOIDANCE WITH PRE-GRANTS

TECHNICAL FIELD

The present disclosure relates generally to communication systems, and more particularly, to systems including at least one wireless device communicating based on grants for downlink reception.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be associated with at least a first transmission and reception point (TRP) and may be configured to transmit a first indication indicating a potential grant of resources for a downlink (DL) transmission for at least one wireless device. The apparatus may further be configured to receive a feedback indicating that the potential grant of the resources is accepted by a wireless device of the at least one wireless device. The apparatus may also be configured to transmit at least one of a second indication indicating a grant of the resources for the DL transmission for the wireless device of the at least one wireless device, or the DL transmission via the resources indicated in the first indication or the second indication.

In an aspect of the disclosure, a method, a computer-readable medium, and an apparatus are provided. The apparatus may be a wireless device configured to receive a first indication indicating a potential grant of resources for a DL transmission associated with a first TRP. The apparatus may further be configured to transmit a feedback indicating that the potential grant of the resources is accepted by the wireless device. The apparatus may also be configured to receive at least one of a second indication indicating a grant of the resources for the DL transmission associated with the first TRP, or the DL transmission via the resources indicated in the first indication or the second indication.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
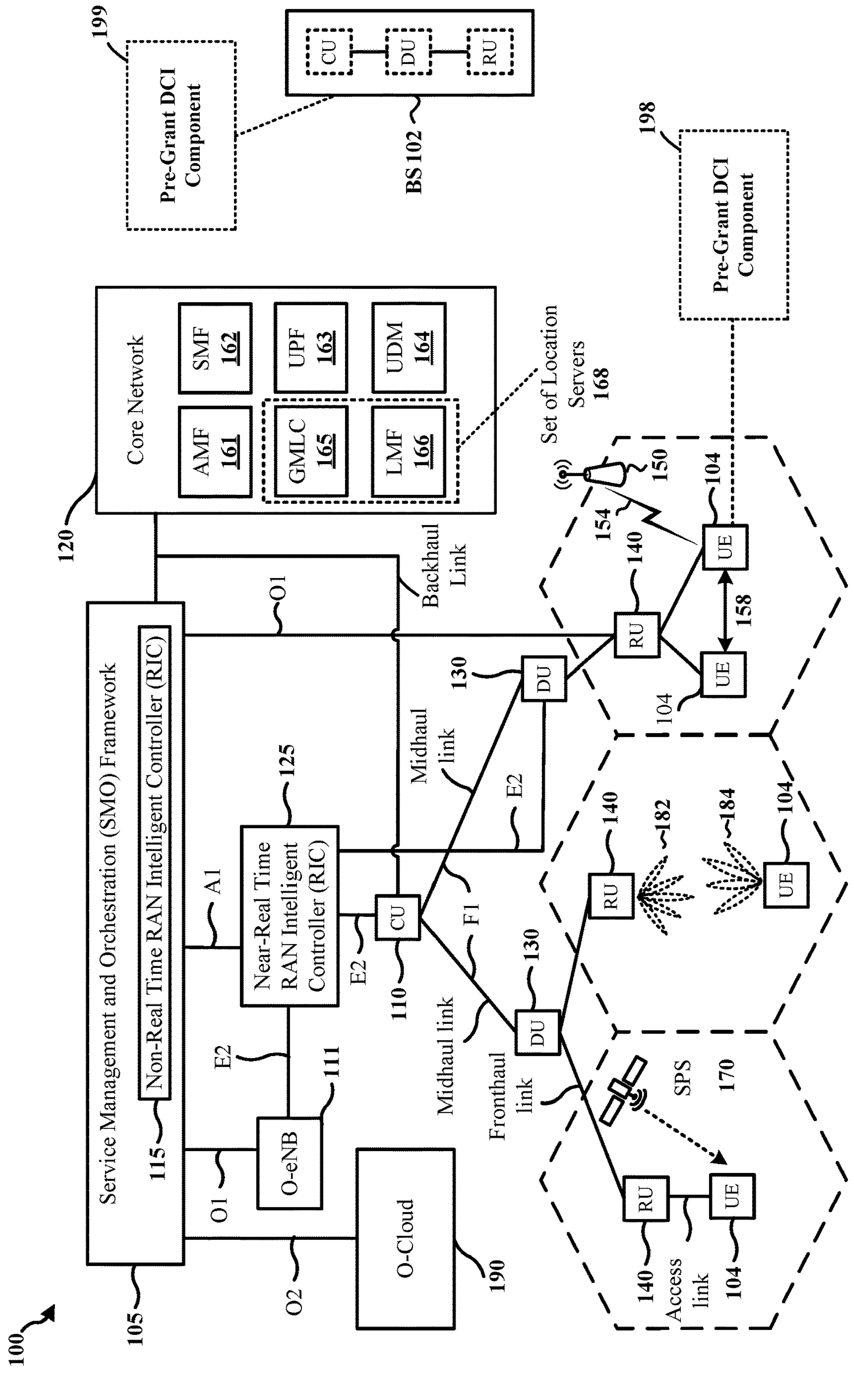
FIG. 1 is a diagram illustrating an example of a wireless communications system and an access network.

In some aspects of wireless communication, e.g., 5G NR as a non-limiting example of a wireless communication technology, a multi-TRP (mTRP) architecture may be implemented allowing a UE to connect to multiple TRPs. In some aspects, multiple TRPs connected to a particular UE may not cooperate and/or coordinate (e.g., in real-time and/or via fast backhaul signaling) to schedule individual communications. The lack of cooperation and/or coordination may lead to "collisions" between communications for the different TRPs such that neither communication can be decoded resulting in wasted resources. For example, a same set of resources (or overlapping resources in one or more of frequency and/or time) may be allocated and/or granted for communication with a particular UE (or other wireless device) by two TRPs such that neither downlink communication can be correctly received and decoded by the UE. Accordingly, a method and apparatus are provided for collision avoidance to improve communication between the UE and the network.

In some aspects, a TRP in a mTRP architecture and may transmit a first indication to a UE informing the UE of a potential grant of resources for a DL transmission. The UE may respond with feedback indicating that the potential grant of the resources is accepted or letting the TRP know that the potential grant is not accepted or conflicts with another grant. After receiving the feedback, the TRP then provide control signaling with a grant of the resources for the DL transmission, e.g., if the UE provided feedback that the potential grant was accepted. If the feedback indicates that the potential grant is not accepted, the TRP may provide a grant for different resources for the DL transmission or may skip sending a grant for the DL transmission. Accordingly, the method and apparatus reduce the effect of collisions while introducing a minimal amount of additional cooperation and/or coordination between independent TRPs and a minimal amount of additional signaling overhead.

In some aspects, the method and apparatus, in some aspects, may be associated with a wireless device in a mTRP architecture (e.g., connected to a plurality of TRPs) and may receive a first indication indicating a potential grant of resources for a DL transmission associated with a first TRP and transmit a feedback indicating that the potential grant of the resources is accepted by the wireless device. The method and apparatus may also receive at least one of a second indication indicating a grant of the resources for the DL transmission associated with the first TRP, or the DL transmission via the resources indicated in the first indication or the second indication. Through the use of feedback from a receiving device, the aspects presented herein enable improved coordination and effective, e.g., non-colliding, use of wireless resources even if coordination is not available between TRPs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE- PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a pre-grant DCI component 198 that may be configured to receive a first indication indicating a potential grant of resources for a DL transmission associated with a first TRP. The pre-grant DCI component 198 may further be configured to transmit a feedback indicating that the potential grant of the resources is accepted by the wireless device. The pre-grant DCI component 198 may also be configured to receive at least one of a second indication indicating a grant of the resources for the DL transmission associated with the first TRP, or the DL transmission via the resources indicated in the first indication or the second indication. In certain aspects, the base station 102 may have a pre-grant DCI component 199 that may be configured to transmit a first indication indicating a potential grant of resources for a DL transmission for at least one wireless device. The pre-grant DCI component 199 may further be configured to receive a feedback indicating that the potential grant of the resources is accepted by a wireless device of the at least one wireless device. The pre-grant DCI component 199 may also be configured to transmit at least one of a second indication indicating a grant of the resources for the DL transmission for the wireless device of the at least one wireless device, or the DL transmission via the resources indicated in the first indication or the second indication. Although the following description may be focused on a single wireless device and two TRPs, the pre-grant formats for resource allocation may be applied for additional wireless devices associated with the same two TRPs or for additional TRPs associated with a same wireless device.

Figures 2A, 2B, 2C, 2D:
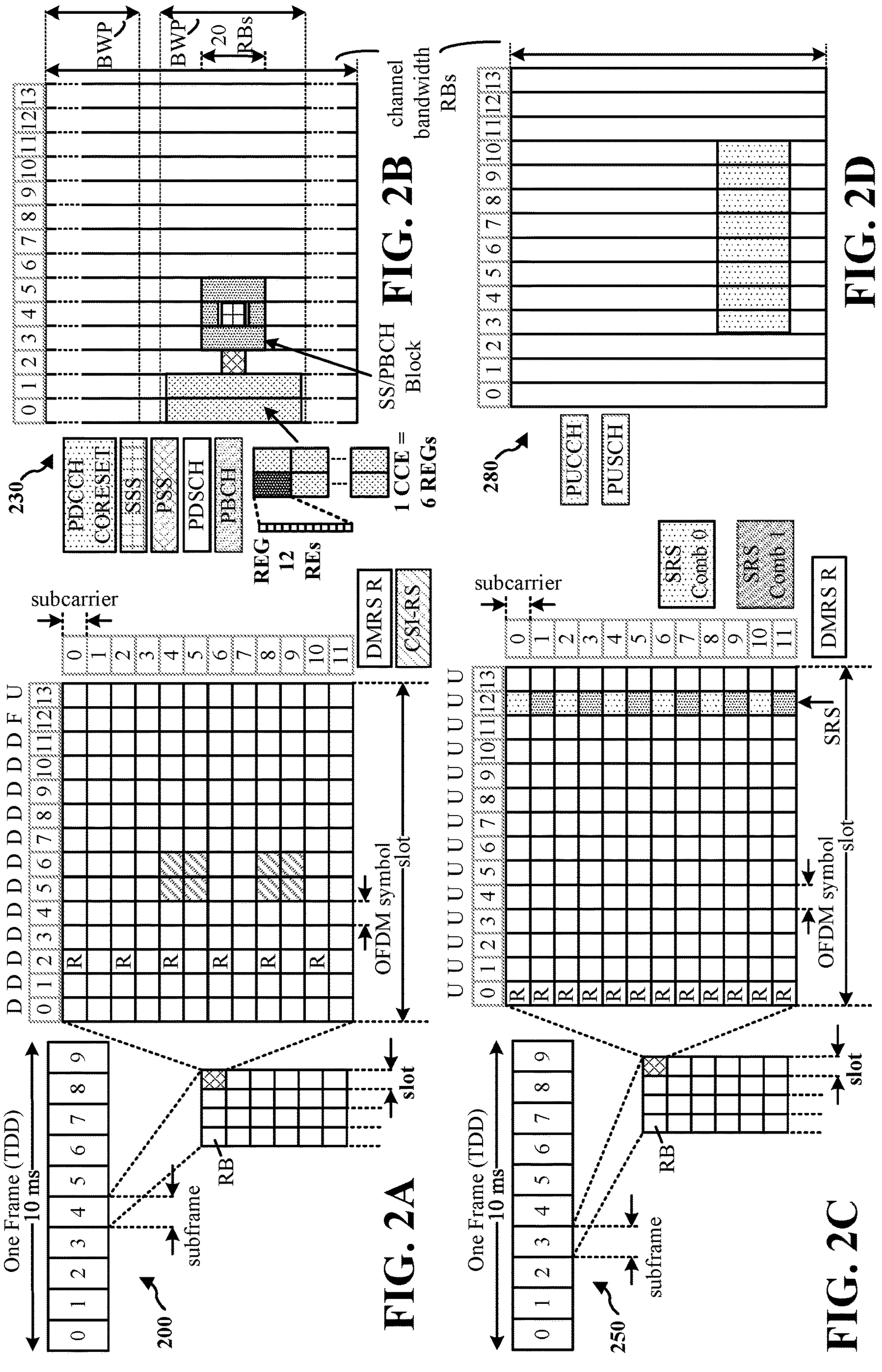
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 1360 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
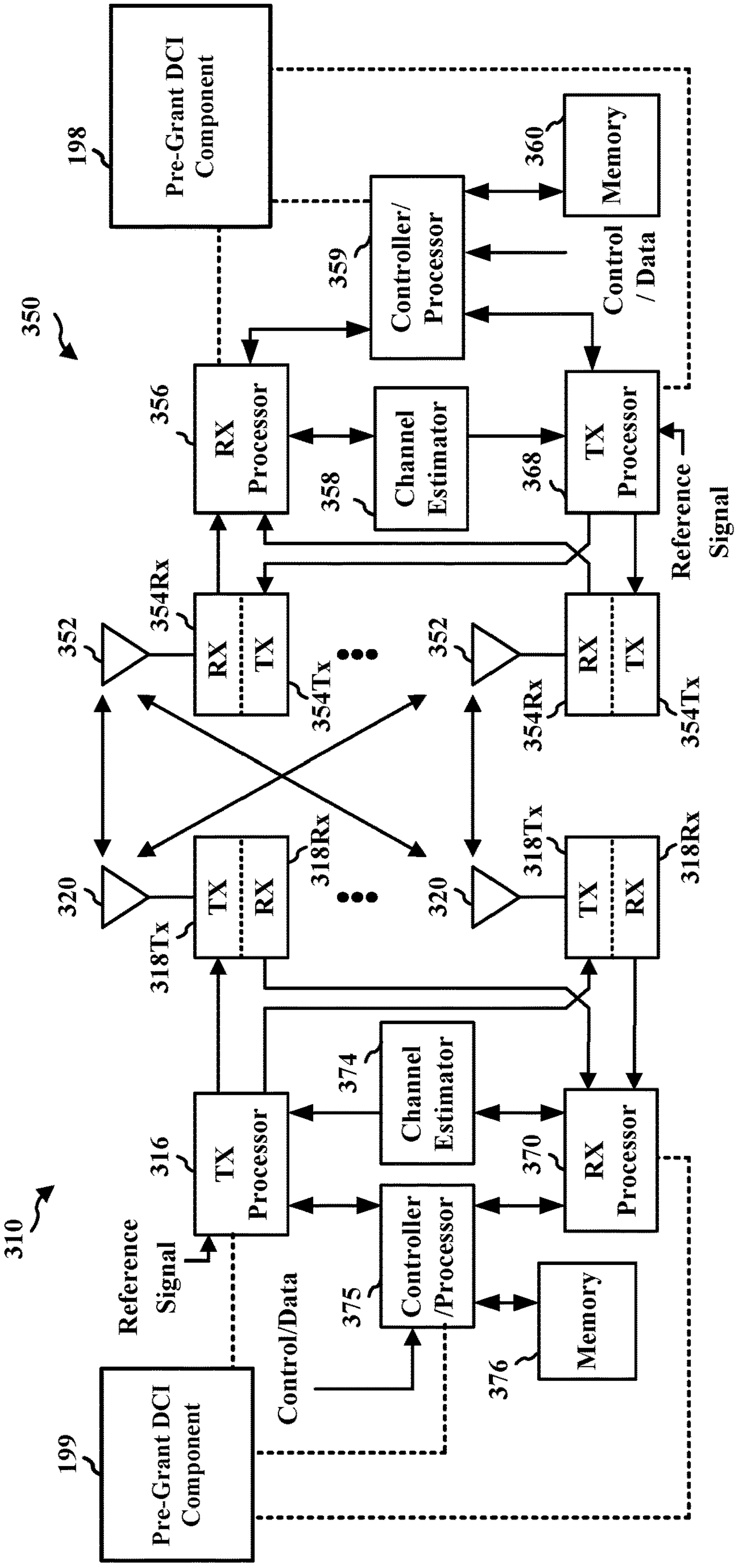
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging. RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the pre-grant DCI component 198 of FIG. 1.

At least one of the TX processor 316, the RX processor 370, and the controller/processor 375 may be configured to perform aspects in connection with the pre-grant DCI component 199 of FIG. 1.

In some aspects of wireless communication multiple TRPs may communicate with a single wireless device and/or a single wireless device may communicate with multiple TRPs. There is the potential for overlap in time, frequency, spatial direction, etc. for communication at a UE with multiple TRPs. In some aspects, mTRP communication may be scheduled with a single DCI (sDCI) transmitted by one of the TRPs. As an example, FIG. 4 illustrates an example in which a TRP0 402 sends an sDCI 411 with scheduling information for downlink communication, such as PDSCH, from the TRP0 402 and the TRP1 406. In some aspects, the mTRP communication may be scheduled by multiple DCI (mDCI), e.g., from the different TRPs. FIG. 4 also shows an example in which the TRP0 402 sends a DCI 412*a* scheduling downlink communication, e.g., PDSCH, from the TRP0 402, and the TRP1 406 sends DCI 412*b* scheduling downlink communication from the TRP1 406. Thus, control and/or data signaling from the TRPs may overlap in time, frequency, and/or spatial directions. For the sDCI example, one or more of spatial division multiplexing (SDM), frequency division multiplexing (FDM), or time division multiplexing (TDM) may be employed for the PDSCHs from different TRPs. For the mDCI example, HARQ ACK/NACK feedback for the different TRPs may be based on a single codebook or may be based on different codebooks. In some aspects, PDCCH from multiple TRPs may be transmitted with repetition having different QCL relationships. In some aspect, PUSCH or PUCCH may be transmitted to multiple TRPs in a TDM manner with repetition, or may be simultaneously transmitted with SDM.

In some aspects, multiple TRPs connected to a particular UE may not cooperate and/or coordinate (e.g., in real-time and/or via fast backhaul signaling) to schedule individual communications. The lack of cooperation and/or coordination may lead to "collisions" between communications for the different TRPs such that one or both of the colliding communications cannot be completed (e.g., transmitted, received, decoded, and/or encoded) leading to wasted resources as described below in relation to FIGS. 4A-6. For example, a same set of resources (or overlapping resources in one or more of frequency and/or time) may be allocated and/or granted by two TRPs for communication with a particular UE (or other wireless device) that does not support both communications (e.g., the overlap is such that the UE does not support transmitting and/or receiving both communications or of decoding and/or encoding both communications, e.g., based on a UE capability).

In some aspects, a per-cell operation of TRPs (e.g., base stations, eNBs, gNBs, etc.) may not include cooperation and/or coordination to serve UEs. For example, each TRP may have an independent scheduler. The network, in some aspects, may have mTRP-capable UEs introduced which may be served by TRPs that do not cooperate or coordinate to serve the UE. For example, fast backhaul signaling between TRPs may not be implemented or available. To support improved wireless communication with mTRP-capable UEs, a method and apparatus are provided that introduce a pre-grant indication of resources that may be subsequently granted, or used, for a communication to reduce collisions and wasted resources for non-cooperating and/or non-coordinating TRPs. The pre-grant indication allows a UE to provide feedback to a scheduling TRP, and the TRP can make adjustments to avoid collisions between communication from other TRPs, even if coordination information is not available between the TRPs. Aspects presented herein provide a type of unified mTRP framework for communication systems including multiple TRPs, which supports mTRP communication with UEs for TRPs of various scheduling coordination capabilities. Additionally, as the aspects enable independent TRP operation, e.g., without a certain level of coordination, the method and apparatus may be extended to active set management with different cells such that each TRP is packaged into an active set member and enables each active set to operate with its own TCI states, RS, CORESET, etc.

In some aspects, a TRP in a mTRP architecture and may transmit a first indication indicating a potential grant of resources for a DL transmission for one or more wireless devices and receive a feedback indicating that the potential grant of the resources is accepted by a wireless device of the one or more wireless devices. The TRP may also transmit at least one of a second indication indicating a grant of the resources for the DL transmission for the wireless device of the one or more wireless devices, or the DL transmission via the resources indicated in the first indication or the second indication.

In some aspects, a wireless device (e.g., a UE) in a mTRP architecture (e.g., connected to a plurality of TRPs) and may receive a first indication indicating a potential grant of resources for a DL transmission associated with a first TRP and transmit a feedback indicating that the potential grant of the resources is accepted by the wireless device. The UE may also receive at least one of a second indication indicating a grant of the resources for the DL transmission associated with the first TRP, or the DL transmission via the resources indicated in the first indication or the second indication. Accordingly, the aspects presented herein reduce the effect of collisions while introducing a minimal amount of additional cooperation and/or coordination between independent TRPs and a minimal amount of additional signaling overhead. In some aspects, the method and apparatus may additionally increase throughput in the absence of collisions to offset the additional signaling in the case of collisions (e.g., collisions that have not been averted or avoided by the method and apparatus as will be described below).

Figure 4A:
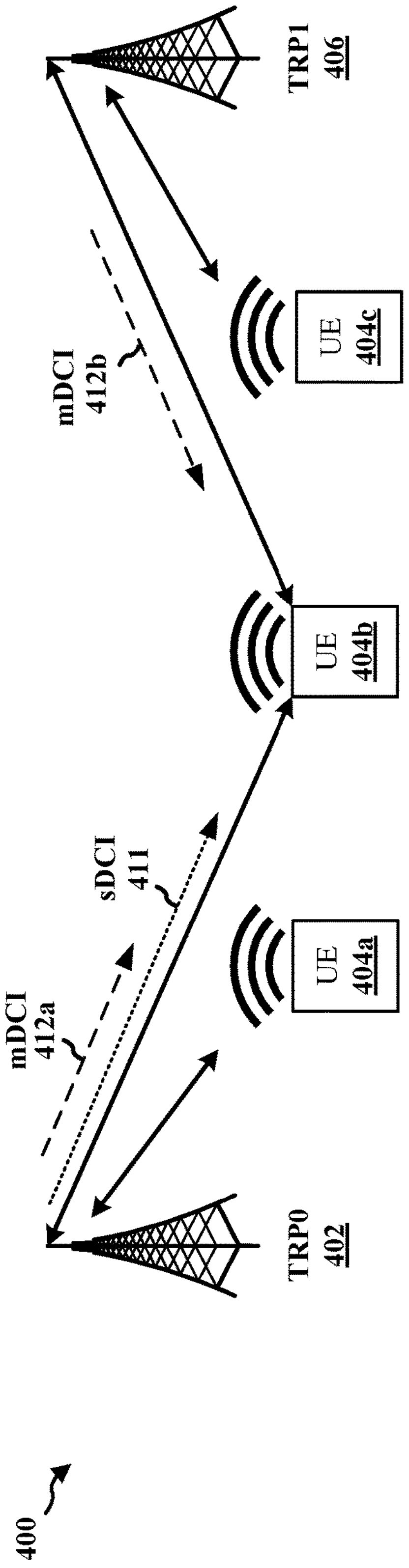
FIG. 4A is a diagram illustrating a set of two TRPs associated with a particular UE in accordance with some aspects of the disclosure.

FIG. 4A is a diagram 400 illustrating a set of two TRPs, TRP0 402 and TRP1 406, associated with a particular UE, UE 404*b*, in accordance with some aspects of the disclosure. In FIGS. 4A-13 below, the term 'TRP' (or 'the TRP') may be used in the place of reciting 'a network device associated with the TRP' with the understanding that certain actions and/or operations described as being performed by a TRP may be performed by the network device associated with the TRP. In some aspects, there may be multiple UEs, e.g., UE 404*a*, UE 404*b*, and UE 404*c*, each in communication with one or more of the TRPs, TRP0 402 or TRP1 406, (which may be base stations, gNBs, etc. or a component of one or more base stations). Traffic to and from the TRPs may be at least partially correlated. As an example, for DL and UL traffic, for mDCI mTRP communication, the traffic arrival at a base station may be correlated. For DL traffic the upper layer may distribute the packets to the two TRPS when there is a common traffic arrival burst. For UL traffic, the UE 404*b* may send a scheduling request (SR) or buffer status report (BSR), and the TRPs may schedule the UE to transmit the data to either TRP. Due to the activity of each TRP, they may not serve the UE continuously. In some aspects, each TRP may run its individual scheduler to serve multiple UEs including the UE 404*b* (which may be referred to as a target UE). If a TRP is lightly loaded, there is a higher likelihood for both TRPs to serve the UE at the same time. If the TRP is more highly loaded, there is a lower likelihood that both TRPs will attempt to serve the UE at the same time.

Figure 4B:
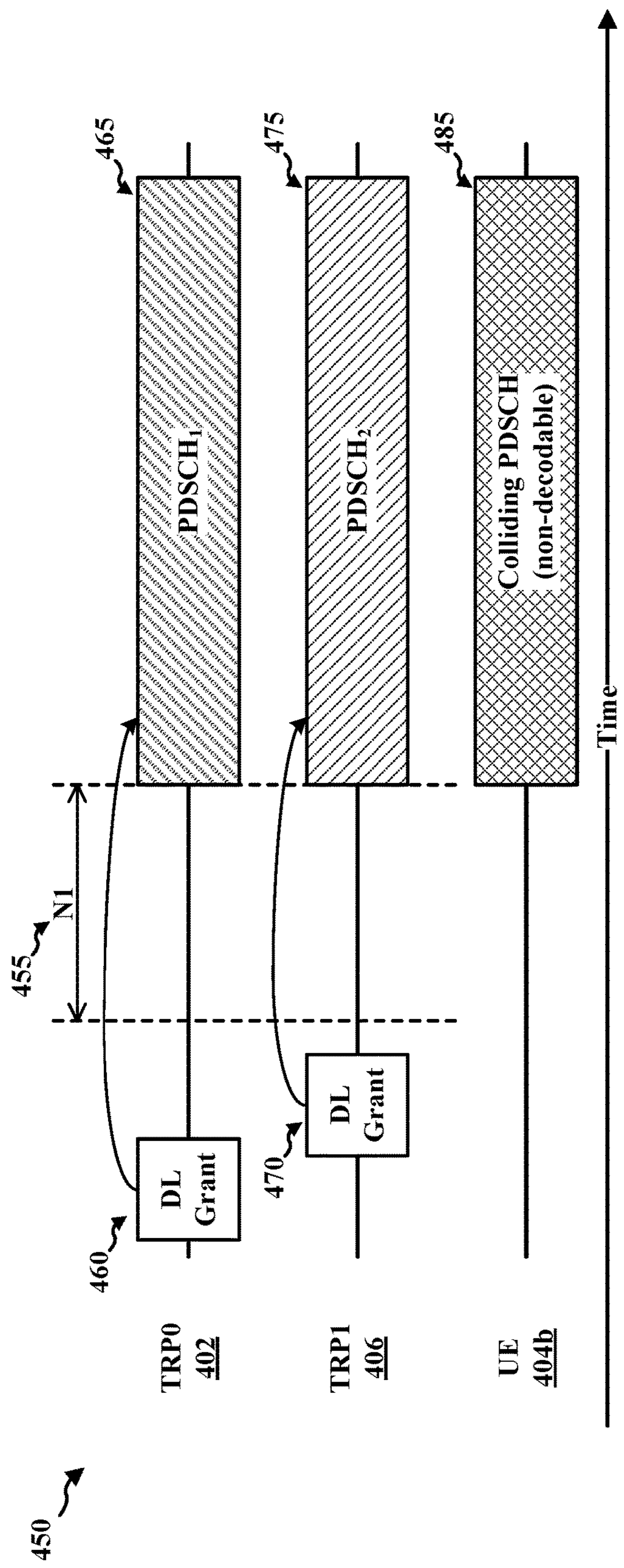
FIG. 4B is a diagram illustrating a collision between a set of two communications associated with the two TRPs illustrated in FIG. 4A in accordance with some aspects of the disclosure.

FIG. 4B is a diagram 450 illustrating a collision between a set of two communications (e.g., a first and second PDSCH) associated with the two TRPs, TRP0 402 or TRP1 406, illustrated in FIG. 4A in accordance with some aspects of the disclosure. For example, TRP0 402 may transmit, and UE 404*b* may receive, a first grant of DL resources 460 for a first PDSCH communication (e.g., $PDSCH_1$ 465) and TRP1 406 may transmit, and UE 404*b* may receive, a second grant of DL resources 470 for a second PDSCH communication (e.g., $PDSCH_2$ 475). While illustrated in terms of conflicting and/or colliding DL resources (e.g., for a PDSCH), in some aspects, one of the granted resources may be for an UL communication (e.g., a PUSCH). The first and second grants of the DL resources 460 and 470 may be received via a DCI or other signaling that precedes the granted resources by at least a time 'N1' 455.

While illustrated as being fully overlapping in time, the granted resources associated with $PDSCH_1$ 465 and $PDSCH_2$ 475, in some aspects, may be partially overlapping in time. Additionally, the granted resources associated with $PDSCH_1$ 465 and $PDSCH_2$ 475, in some aspects, may not overlap in frequency, or may partially or fully overlap in frequency.

In some aspects, a UE may support simultaneous (e.g., at least partially overlapping in time) reception from mTRPs or simultaneous transmission to mTRPs. The collision illustrated for resources 485, in some aspects, may be based on the capabilities of the UE 404*b* to transmit and/or receive simultaneously (e.g., overlapping in time such as in a same slot or symbol) on one or more frequency ranges. For example, a UE with a single antenna may experience a collision for two transmissions at a same time despite the two transmissions using different frequencies, while a UE with multiple antennas may be capable of receiving and decoding (or encoding and transmitting) a first transmission via a first range of frequencies while receiving and decoding (or encoding and transmitting) a second transmission overlapping in time using a separate (or only slightly-overlapping) range of frequencies. For a collision between two PDSCH transmissions, one or both of the two PDSCH transmissions may be undecodable. For example, if a first PDSCH communication (e.g., associated with $PDSCH_1$ 465) of the two PDSCH communications is received with a power that is significantly greater than a received power of a second PDSCH communication (e.g., associated with $PDSCH_2$ 475), the first PDSCH communication may be decodable despite the collision while the second PDSCH communication may not be decodable. Whereas, if the first and second PDSCH communications are received with similar powers, neither communication may be decodable. For a collision involving at least one UL communication (e.g., a UL/UL conflict or a DL/UL conflict), the collision may be avoided by the UE by omitting (e.g., canceling or skipping) the transmission of the at least one UL communication. A UE may consider it an error case if a serving combination, e.g., overlapping resources scheduled for reception from mTRPs or for transmission to mTRPs, exceeds the capability supported by the UE. In some aspects, collision detection and reporting may be provided. Detection may be PDCCH decoding based, and reporting may be in ACK/NACK or MAC-CE. The reporting may include and ACK/NACK without indication of the cause or may provide more collision indication information. In some aspects the detection and reporting may be based on a backoff window. Communication with multiple TRPs may additionally increase throughput in the absence of collisions to offset the additional signaling in the case of collisions (e.g., collisions that have not been averted or avoided). Aspects presented herein allow the UE to help provide some coordination information between multiple TRPs that may have separate, independent schedulers without a fast backhaul connection to provide coordination directly between the TRPs. By avoiding collisions, the information provided by the UE reduces resource waste and improves the accuracy of communication exchanged between the UE and the TRPs.

Figure 5:
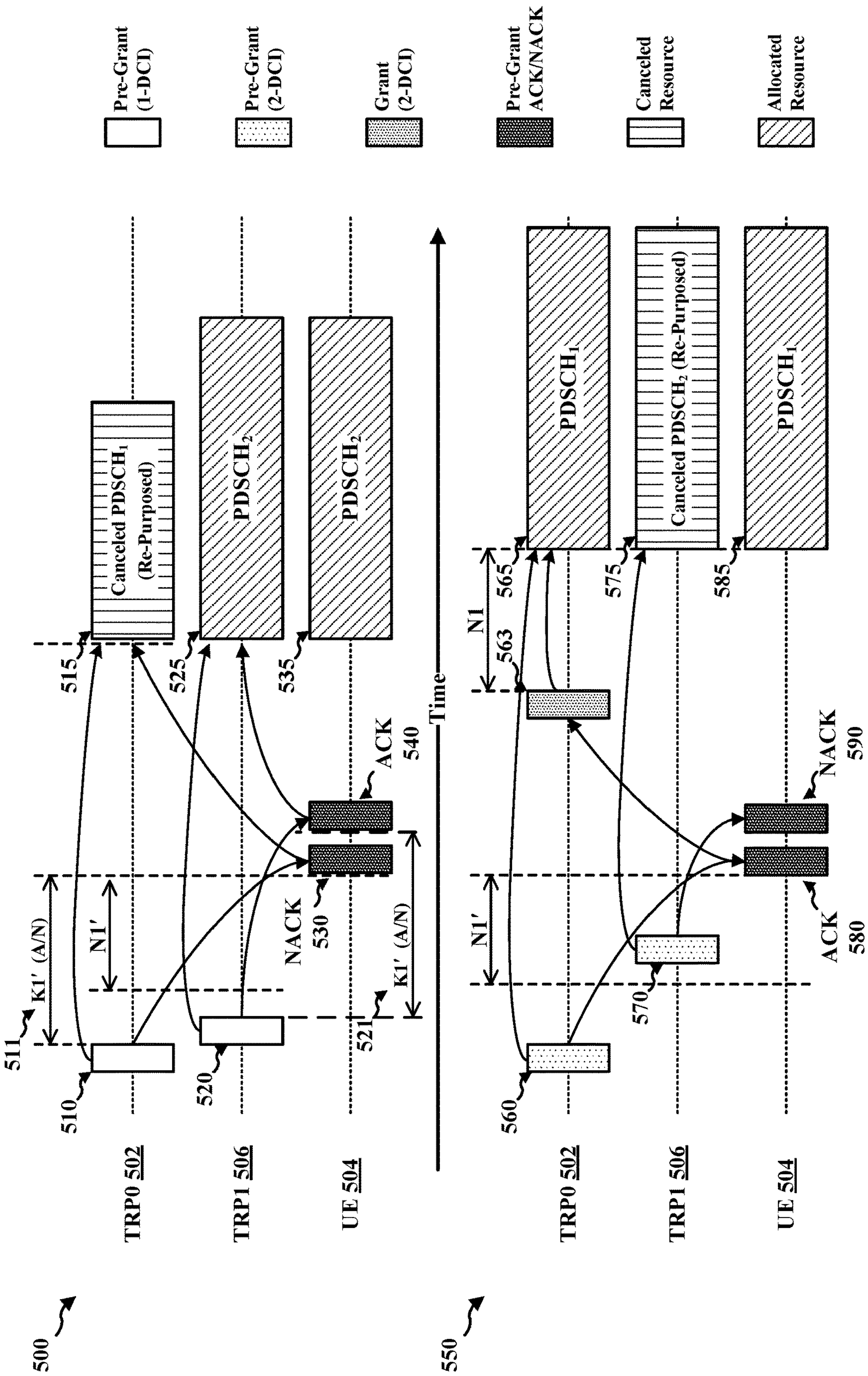
FIG. 5 is a set of diagrams illustrating the use of a single-DCI format for a pre-grant signaling and the use of a two-DCI format for the pre-grant signaling used to avoid collisions in accordance with some aspects of the disclosure.

FIG. 5 is a set of diagrams 500 and 550 illustrating the use of a single-DCI format for a pre-grant signaling and the use of a two-DCI format for the pre-grant signaling used to avoid collisions in accordance with some aspects of the disclosure. Diagrams 500 and 550 assume a system including a first TRP, the TRP0 502, a second TRP, the TRP1 506, and a UE 504 in communication, or associated, with both the TRP0 502 and the TRP1 506. Diagrams 500 and 550 illustrate that the TRP0 502 may transmit a DCI 510 using a single-DCI format (or may transmit a DCI 560 using a two-DCI format) at a first time and that the TRP1 506 may transmit a DCI 520 using the single-DCI format (or may transmit a DCI 570 using a two-DCI format) at a second time. Each DCI (e.g., whether referred to as a pre-grant DCI or a DCI) may indicate a corresponding set of resources for a DL channel (e.g., PDSCH or PDCCH represented by PDSCH in the diagrams 500 and 550). The DCI 510 and the DCI 520, in some aspects, may include all the information included in a normal DL and/or UL grant as well as additional information relating to a time offset between a slot including the pre-grant DCI and a slot including a corresponding feedback resource (e.g., a value, K1' 511, or a value, K1' 521, respectively, similar to a K1 value indicating a number of slots between a slot including a granted resource and a slot including a corresponding feedback resource), a priority, a total DL assignment index (DAI), and/or a counter DAI for the corresponding feedback resource (e.g., feedback resource 530 and feedback resource 540, respectively) (where the total DAI and counter DAI may be associated with a type 2 HARQ codebook). The DCI 510 and 520 may in some aspects be referred to as a pre-grant or pre-grant DCI, as the TRPs may monitor for feedback from the UE before proceeding to use the granted/indicated resources.

The pre-grant DCI 560 and the pre-grant DCI 570, in some aspects, may include a limited set of information (e.g., less information than is included in a normal DL and/or UL grant) used to identify a conflict/collision based on the capabilities of the UE 504 and the additional information relating to the feedback resource (e.g., a value K1', a priority, a total DAI, and/or a counter DAI). In some aspects, the content of the pre-grant DCI may be based on information that will help a UE identify a collision that is not supported by the UE. For example, if the UE cannot receive (e.g., does not support reception of) two PDSCHs in the same slot, the pre-grant DCI 560 and/or the pre-grant DCI 570 may include a slot index (e.g., in the form of a K0 value) for the PDSCH resources associated with the pre-grant DCI 560 and/or the pre-grant DCI 570. Similarly, if the UE 504 cannot receive (e.g., does not support reception of) two time overlapping PDSCHs, the pre-grant DCI 560 and/or the pre-grant DCI 570 may include a slot index (in the form of K0) and a start and length indicator value (SLIV) for the PDSCH. If the UE 504 cannot receive (e.g., does not support reception of) two time and frequency overlapping PDSCHs, the pre-grant DCI 560 and/or the pre-grant DCI 570 may include a slot index (in the form of K0), a SLIV for the PDSCH, and a frequency domain resource allocation (FDRA). If the UE 504 cannot receive (e.g., does not support reception of) two time and frequency overlapping PDSCHs, with combined rank above a certain threshold value, the pre-grant DCI 560 and/or the pre-grant DCI 570 may include a slot index (in the form of K0), a SLIV for the PDSCH, an FDRA, and a rank (or antenna port assignment).

In some aspects, the pre-grant DCI 510, 520, 560, and/or 570 may also provide additional information to help the UE 504 determine how to resolve a collision if detected. In some aspects, there may be benefits to choosing one pre-grant DCI (e.g., for a PDSCH communication such as pre-grant DCI 520) over another conflicting pre-grant DCI (e.g., pre-grant DCI 510). In some aspects, the pre-grant DCI may include additional information regarding one or more of a payload size, a priority, a delay bound, a head of line (e.g., a sequence number), or other relevant information for a communication associated with a pre-grant DCI for the UE to use in selecting which pre-grant DCI to accept. For example, if a first pre-grant DCI (e.g., pre-grant DCI 520) is associated with a PDSCH having a larger payload (or otherwise requiring more resources in time and/or frequency) than a second pre-grant DCI (e.g., pre-grant DCI 510), it may be better to select the first pre-grant DCI as it may be easier to reschedule resources for the smaller payload. In some aspects providing payload size information, the pre-grant DCI may provide information regarding a SLIV, an FDRA, a rank, and a modulation and coding scheme (MCS) used to compute a TB size associated with the payload size. Additionally, or alternatively, in some aspects, it may be better to accept a pre-grant DCI for a communication with a higher priority or with a smaller delay bound (e.g., a shorter time to expiration or remaining packet delay budget). In some aspects, the head of line (or sequence number may also, or alternatively, be used to determine which pre-grant DCI to accept, e.g., a first communication in a sequence may take precedence over subsequent communications.

Based on the type of information included in the pre-grant DCI, the pre-grant DCI may use a same DCI format as other grants (e.g., a DCI Format 1_0, or Format 1_2) or a different (pre-grant) DCI format. In some aspects, the DCI format for grants and pre-grants may use reserved bits to indicated the additional information for the pre-grant (e.g., resources for the feedback, a delay bound, or a sequence number, where payload and priority may already be indicated in the DCI format). Additionally, when using a DCI format for grants and pre-grants, the pre-grant DCI may be indicated to be a pre-grant DCI instead of a grant DCI by one of a plurality of methods discussed below. In some aspects, a default configuration (or a set of selectable/indexed configurations or values) for feedback resources (or other characteristics) may be negotiated and/or configured previously, e.g., via RRC messages, and be associated with (or indicated in) a subsequent DCI identified to be a pre-grant DCI for PDSCH resources. One or more new, different formats for a pre-grant DCI, in some aspects, may be defined and/or selected based on the type of information (e.g., one or more of the types of information or specific information discussed above) identified for inclusion in the pre-grant DCI (e.g., for a pre-grant DCI format generally, or selected from a plurality of options for a particular pre-grant DCI).

A pre-grant DCI format, e.g., that is different from a grant DCI format, in some aspects, may be identified based on a new/different radio network temporary identifier (RNTI) used to mask/scramble the pre-grant DCI or by information (e.g., in a pre-defined field or in a reserved bit) included in the pre-grant DCI. For example, a pre-grant DCI format, in some aspects, may have a different length than a grant DCI format and may be associated with different resources (e.g., for blind decoding) than a grant DCI format. In some aspects, a pre-grant DCI format may use a same RNTI as, or a different RNTI than, a grant DCI format. A pre-grant DCI format, in some aspects, may be associated with a same set of resources as a grant DCI format and may be zero-padded to match a grant DCI format length (e.g., a DCI Format 1_0, or Format 1_2) and may use a new RNTI or a different RNTI than the grant DCI format such that a blind decoding for the grant DCI format (and a descrambling based on the new/different RNTI) may be used to detect a pre-grant DCI using the pre-grant-specific DCI format. A pre-grant DCI format, in some aspects, may use a format similar to a grant DCI format (e.g., with padded zeros to match the length) but may use one of a set of combinations of values for different fields that indicate that it is a pre-grant DCI instead of a grant DCI using a similar format. For example, a pre-grant DCI not using an FDRA for conflict/collision detection may use a particular value (e.g., a null value or empty grant) in the FDRA field, or a special combination of values in a set of fields (e.g., one or more values for HARQ ID, redundancy version identifier (RVID), new data indicator (NDI), MCS, etc.) may be used to indicate that the DCI is a pre-grant DCI format instead of a grant DCI format.

Diagrams 500 and 550 illustrate successful collision avoidance using the single-DCI and two-DCI formats, respectively. For example, diagram 500 illustrates that based on receiving the pre-grant DCI 510 associated with $PDSCH_1$ (e.g., PDSCH resources 515) and the pre-grant DCI 520 associated with $PDSCH_2$ (e.g., PDSCH resources 525), the UE 504 may transmit a NACK via feedback resource 530 rejecting the pre-grant DCI 510 and may transmit an ACK via feedback resource 540 accepting the pre-grant DCI 520. Accordingly, the TRP0 502 (or the UE 504) may cancel the transmission associated with $PDSCH_1$ while the TRP1 506 (or the UE 504) may transmit the transmission associated with the $PDSCH_2$ resulting in the communication associated with $PDSCH_2$ (e.g., via PDSCH resources 535 that are the same PDSCH resources 525).

In some aspects, the feedback resource 530 or the feedback resource 540 may be configured to include an indication of a detected conflict/collision as well as one or more of a reason for the conflict/collision and/or a suggestion for resolving the conflict/collision. For example, a feedback resource may be configured with a set of bits for indicating that (1) no conflict/collision was detected and/or identified and (2) a conflict/collision was detected and/or identified and the type of resources involved in the conflict/collision (e.g., an indicated set of PDSCH resources and one or more of an additional set of PDSCH resources, a set of PDCCH resources, a set of PUSCH resources, or a set of PUCCH resources). Based on detecting a conflict, a UE may provide additional information for conflict/collision resolution, e.g., an increased, or new, K1 value (e.g., for a PDSCH pre-grant) or a new K2 value (e.g., for a PUSCH pre-grant).

In some aspects, the collisions in diagram 500 and 550 are successfully avoided because the pre-grant DCI 510 and pre-grant DCI 520 (or the pre-grant DCI 560 and the pre-grant DCI 570) are both pre-grant DCIs and are received with sufficient time for the UE 504 to determine whether both pre-grant DCIs can be accepted or whether there is a conflict/collision between the resources associated with the pre-grant DCIs and, in the case of conflicting/colliding resources, which pre-grant DCI to accept and/or reject. In some aspects, UE 504 may determine whether to accept a pre-grant based on information received at least a time N1' before transmitting feedback via an indicated feedback resource. For example, the processing of pre-grant DCI 510 at the UE 504 may take at least a time N1' and the value K1' included in pre-grant DCI 510 may be configured to indicate a time offset greater than N1'. In some aspects, N1' may be shorter than a corresponding time N1 for processing a resource grant before receiving and/or transmitting a communication via the granted resources.

In diagram 500, for example, because both pre-grant DCI 510 and pre-grant DCI 520 are received more than a time N1' before the feedback resource 530, the UE 504 determines to reject the pre-grant DCI 510 and to accept the pre-grant DCI 520 and transmits a NACK via feedback resource 530 and an ACK via feedback resource 540 despite pre-grant DCI 510 being received earlier. This rejection of the earlier-received pre-grant DCI, in some aspects, is possible because both were received in time to be considered in responding to the pre-grant DCI 510 via feedback resource 530. In diagram 500, for example, the UE 504 determines to reject the pre-grant DCI 510 and to accept the pre-grant DCI 520 despite pre-grant DCI 510 being received earlier because both were received in time to be considered in responding to the pre-grant DCI 510 via feedback resource 530.

However, in diagram 550 illustrating a two-DCI format for the pre-grant signaling, because pre-grant DCI 570 associated with $PDSCH_2$ (e.g., PDSCH resources 575) is received less than a time N1' before the feedback resource 580, the UE 504 may determine to accept the pre-grant DCI 560 associated with $PDSCH_1$ (e.g., PDSCH resources 565) (and transmit an ACK via feedback resources 580 and receive a grant DCI 563) based on no detected conflict/collision. For the pre-grant DCI 570, the UE 504 may determine that there is a conflict/collision with the resources indicated in the accepted pre-grant DCI 560 and may reject the pre-grant DCI 570 (and transmit a NACK via feedback resources 590) based on the detected conflict/collision. Accordingly, the TRP1 506 (or the UE 504) may cancel the transmission associated with $PDSCH_2$ (e.g., PDSCH resources 575) while the TRP0 502 (or the UE 504) may transmit the grant DCI 563 for the transmission associated with the $PDSCH_1$ (e.g., PDSCH resources 565) resulting in the communication associated with $PDSCH_1$ (e.g., PDSCH resources 585). The grant DCI 563, in some aspects, may include at least the information not included in the pre-grant DCI 560 using a new DCI format or using a known DCI format (e.g., Format 1_0, or Format 1_2).

While the UE 504 may have determined to accept the pre-grant DCI 570 over the pre-grant DCI 560 had they both arrived in time (more than a time N1' before the feedback resource 580), the UE 504 has avoided the waste of resources associated with a conflict/collision. Although the above examples (both pre-grant DCIs arriving before the time N1' in diagram 500 or one pre-grant DCI arriving after the time N1' in diagram 550) were illustrated in only one of the single-DCI format or the two-DCI format for the pre-grant signaling, each example is similarly applicable to the other format. Accordingly, FIGS. 4A and 4B illustrate that without the use of a pre-grant DCI, conflicts/collisions between communications and/or resource grants may occur for two independent TRPs and FIG. 5 illustrates that conflicts/collisions may be avoided when using a pre-grant DCI.

Figure 6:
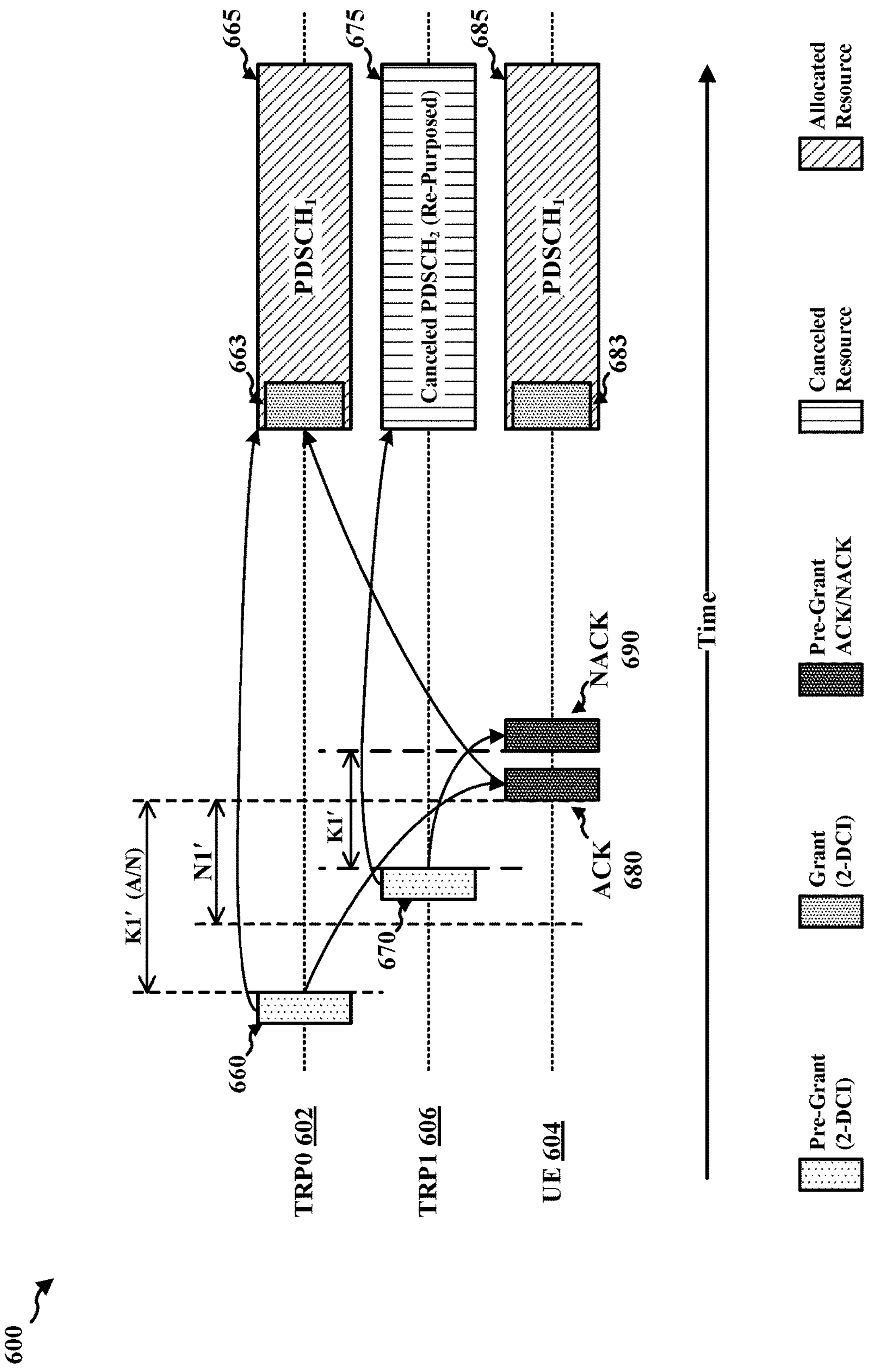
FIG. 6 is a diagram illustrating the use of a two-DCI format associated with a piggybacked DCI providing additional information not included in the pre-grant DCI used to avoid collisions in accordance with some aspects of the disclosure.

FIG. 6 is a diagram 600 illustrating the use of a two-DCI format associated with a piggybacked DCI (e.g., DCI sent with the PDSCH) providing additional information not included in the pre-grant DCI used to avoid collisions in accordance with some aspects of the disclosure. Similar to diagram 550, diagram 600 assumes a system including a first TRP, the TRP0 602, a second TRP, the TRP1 606, and a UE 604 in communication, or associated, with both the TRP0 602 and the TRP1 606. Diagram 600 illustrates that the TRP0 602 may transmit a pre-grant DCI 660 using a two-DCI format at a first time and that the TRP1 606 may transmit a pre-grant DCI 670 using a two-DCI format at a second time. Each pre-grant DCI may indicate a corresponding set of resources for a DL channel (e.g., PDSCH or PDCCH). As described in relation to pre-grant DCIs 510, 520, 560, and 570 of FIG. 5, the pre-grant DCI 660 or the pre-grant DCI 670, in some aspects, may include all the information included in a normal DL grant (e.g., an FDRA, an MCS, a SLIV, etc.) as well as additional information specific to a pre-grant, or may include a limited set of information for identifying conflicts/collisions based on the UE capabilities. In some aspects, the limited set of information may include the additional information for determining which pre-grant to accept if a conflict/collision is identified and/or detected. In some aspects, the DCI (e.g., 660 and 670) may indicate the resource to be used for PDSCH, and a PRI and K1 resource for the UE to report feedback (e.g., ACK/NACK) for the grant. The DCI, or pre-grant, may also be referred to as a reservation, in some aspects.

Diagram 600 illustrates successful collision avoidance as described above in relation to diagram 550 using a two-DCI format. However, the two-DCI format illustrated in diagram 550 includes a (first) pre-grant DCI 560 and a (subsequent) grant DCI 563 while the two-DCI format illustrated in diagram 600 includes a pre-grant DCI 660 providing at least a first set of information for identifying a conflict/collision and a piggybacked DCI 663 providing a set of additional information associated with the communication associated with $PDSCH_1$ (e.g., PDSCH resources 665 or PDSCH resources 685) not included in the pre-grant DCI 660. For example, diagram 600 illustrates that based on receiving the pre-grant DCI 660 associated with $PDSCH_1$ (e.g., PDSCH resources 665) and the pre-grant DCI 670 associated with $PDSCH_2$ (e.g., PDSCH resources 675), the UE 604 may transmit an ACK via feedback resource 680 accepting the pre-grant DCI 660 and may transmit a NACK via feedback resource 690 (or may skip transmission of an ACK) rejecting the pre-grant DCI 670. Accordingly, the TRP0 602 (or the UE 604) may transmit the transmission associated with $PDSCH_1$ including the piggybacked DCI 663 while the TRP1 606 (or the UE 604) may cancel the transmission associated with the $PDSCH_2$ resulting in the communication associated with $PDSCH_1$ (e.g., PDSCH resources 685) and piggybacked DCI 683. In some aspects, the piggybacked DCI 663 may include information for the PDSCH not included in the pre-grant DCI 660, such as a HARQ ID (e.g., a HARQ process number), an NDI, or CSI trigger information.

Similar to the discussion of diagram 550, in diagram 600, because pre-grant DCI 670 associated with $PDSCH_2$ is received less than a time N1' before the feedback resource 680, the UE 604 may determine to accept the pre-grant DCI 660 associated with $PDSCH_1$ (and transmit an ACK via feedback resources 680) based on no detected conflict/collision. For example, for a pair of colliding PDSCHs, for the earlier ACK/NACK for pre-grant transmission, if the pre-grant from the other TRP is not received N1' symbols before the ACK/NACK, the UE may not be expected to decline the pre-grant corresponding to the earlier ACK/NACK. For the pre-grant DCI 670, the UE 604 may determine that there is a conflict/collision with the resources indicated in the accepted pre-grant DCI 660 and may reject the pre-grant DCI 670 (and transmit a NACK via feedback resources 690) based on the detected conflict/collision. Accordingly, the TRP1 606 (or the UE 604) may cancel the transmission associated with $PDSCH_2$ while the TRP0 602 (or the UE 604) may transmit the transmission associated with the $PDSCH_1$ (including the piggybacked DCI 663) resulting in the communication associated with $PDSCH_1$ (e.g., PDSCH resources 685) (including the piggybacked DCI 683). If a conflicting pre-grant is received prior to the time threshold N1', the UE may make a decision about which grant to decline. While the UE 604 may have determined to accept the pre-grant DCI 670 over the pre-grant DCI 660 had they both arrived in time (more than a time N1' before the feedback resource 680), the UE 604 has avoided the waste of resources associated with a conflict/collision. Accordingly, FIGS. 4A and 4B illustrate that without the use of a pre-grant DCI, conflicts/collisions between communications and/or resource grants may occur for two independent TRPs while FIGS. 5 and 6 illustrate that conflicts/collisions may be avoided when using a pre-grant DCI.

Figure 7:
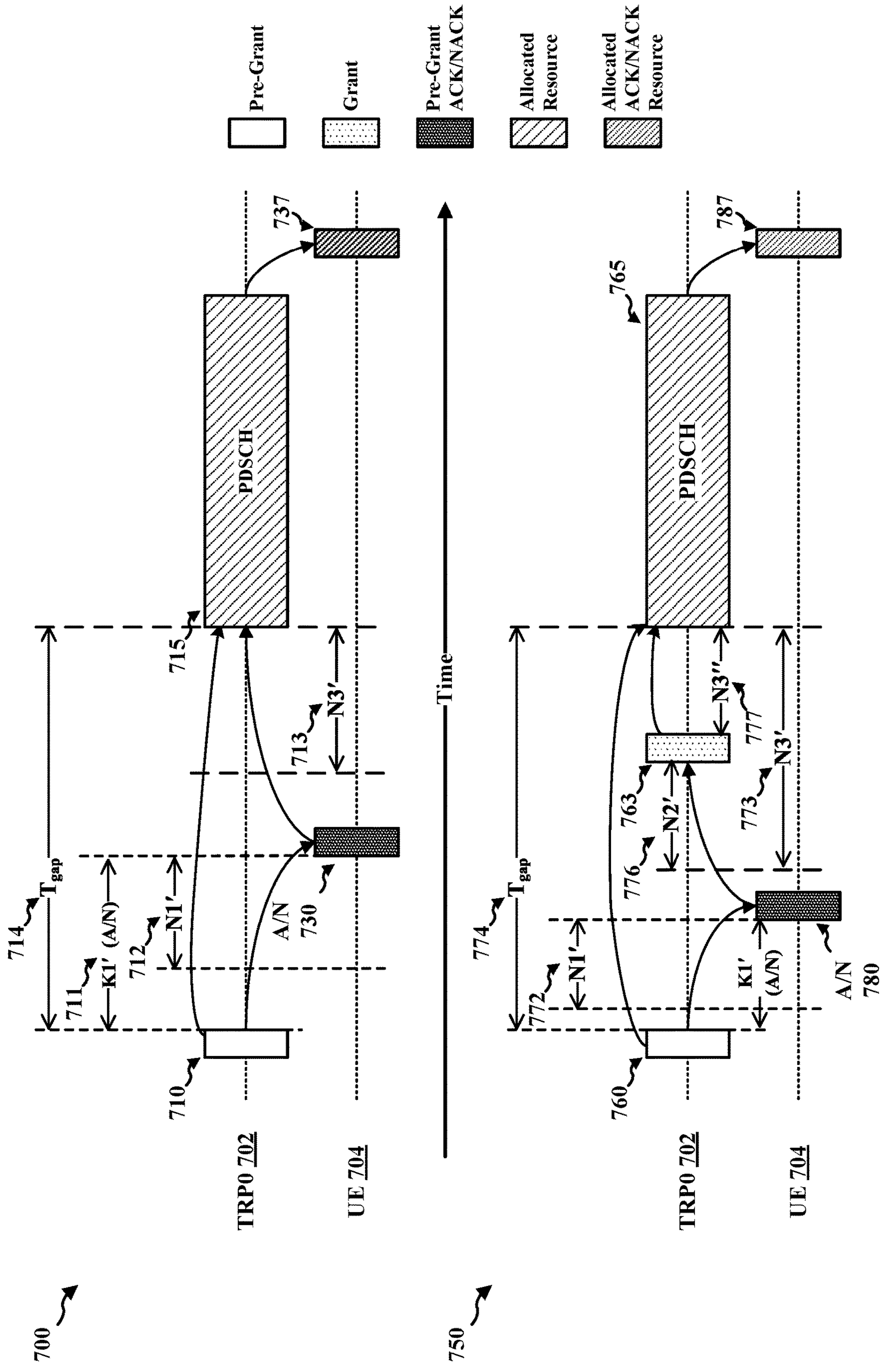
FIG. 7 is a set of diagrams illustrating a set of considerations relating to the timing of messages associated with a pre-grant DCI for a single-DCI format, and for a two-DCI format, for a pre-grant signaling in accordance with some aspects of the disclosure.

FIG. 7 is a set of diagrams 700 and 750 illustrating a set of considerations relating to the timing of messages associated with a pre-grant DCI for a single-DCI format, and for a two-DCI format, for a pre-grant signaling in accordance with some aspects of the disclosure. Diagrams 700 and 750 are illustrated using a first TRP, the TRP0 702, transmitting a pre-grant DCI and a UE 504 receiving the pre-grant DCI and transmitting an associated feedback (e.g., an ACK or NACK). Diagram 700 illustrates that, in some aspects using a single-DCI format for pre-grant signaling, a pre-grant DCI 710 indicates a feedback resource 730 using a value K1' 711 (e.g., a value indicating a number of slots separating the slot including the pre-grant DCI 710 and the slot including the feedback resource 730). The value K1' 711, in some aspects, may be configured to indicate an offset greater than a time N1' 712 that may be related to a time for the UE 504 to process the pre-grant DCI 710 (e.g., to decode the pre-grant DCI 710 and to determine whether to accept or reject the pre-grant DCI 710) and generate feedback for transmission (e.g., via feedback resource 730). After receiving the pre-grant DCI 710, the UE 504 may process the pre-grant DCI 710 and transmit feedback (e.g., an ACK or NACK) via the feedback resource 730.

In some aspects, the feedback resource 730 is configured to precede the resources (e.g., PDSCH resources 715) indicated in the pre-grant DCI 710 by at least a time N3' 713. The time N3' 713 may be based on a time after receiving the feedback (e.g., an ACK/NACK, or an absence of feedback) for the TRP0 702 to process (and/or interpret) the feedback and prepare the communication associated with the PDSCH resources 715. The time N3' 713, in some aspects, may be based on a processing speed of a network entity (e.g., a base station, or network node) associated with TRP0 702. In some aspects, the time N3' 713 may further be based on a minimum offset between transmitting the feedback via feedback resource 730 and the beginning of the PDSCH resources 715 for receiving a PDSCH communication expected by, and/or depending on, the UE 504. If the time N3' 713 is based on an expected minimum offset associated with the UE 504, in some aspects, the UE 504 may indicate a value for the minimum offset (e.g., an index into an indexed list, a minimum number of symbols, etc.) to the TRP0 702 before the transmission of the pre-grant DCI 710 (e.g., in an RRC configuration message during an initial configuration). Accordingly, the overall timeline for the pre-grant DCI, and specifically a $T_{gap}$ 714 between the end of the pre-grant DCI 710 and the beginning of the PDSCH resources 715, in some aspects, may be configured to allow for all the processing times and minimum offsets associated with the pre-grant DCI 710. In some aspects, a timeline between the PDSCH resources 715 and the associated feedback resources 737 may be unaffected by the use of a pre-grant DCI signaling format. In some aspects, the pre-grant for a PDSCH may be transmitted N13 symbols prior to the first symbol of the PDSCH, where N13≥N1'+N3'. In some aspects, N13 may be defined based on being larger than N1', e.g., N13≥N1'.

Diagram 750 illustrates that, in some aspects using a two-DCI format for pre-grant signaling, a pre-grant DCI 760 indicates a feedback resource 780 using a value K1' 771 (e.g., a value indicating a number of slots separating the slot including the pre-grant DCI 760 and the slot including the feedback resource 780). The value K1' 771, in some aspects, may be configured to indicate an offset greater than a time N1' 772 that may be related to a time for the UE 504 to process the pre-grant DCI 760 (e.g., to decode the pre-grant DCI 760 and to determine whether to accept or reject the pre-grant DCI 760) and generate feedback for transmission (e.g., via feedback resource 780). After receiving the pre-grant DCI 760, the UE 504 may process the pre-grant DCI 760 and transmit feedback (e.g., an ACK or NACK) via the feedback resource 780.

In some aspects, the feedback resource 780 is configured to precede the resources (e.g., PDSCH resources 765) indicated in the pre-grant DCI 760 by at least a time N3' 773. The time N3' 773 may be based on a (minimum) time after receiving the feedback (e.g., an ACK/NACK, or an absence of feedback) for the TRP0 702 to process (and/or interpret) the feedback and transmit a grant DCI 763 (e.g., a time N2' 776). The time N3' 773, in some aspects, may further be based on a (minimum) time (e.g., a time N3" 777) for the TRP0 702 to prepare the communication associated with the PDSCH resources 765 after transmitting the grant DCI 763 (or after receiving the feedback via feedback resources 780). The time N3' 773 (and the time N3" 777), in some aspects, may be based on a processing speed of a network entity (e.g., a base station, or network node) associated with TRP0 702. In some aspects, the time N3' 773 (and the time N3" 777) may further be based on a minimum offset between receiving the grant DCI 763 (or transmitting the feedback via feedback resource 780) and the beginning of the PDSCH resources 765 for receiving a PDSCH communication expected by, and/or depending on, the UE 504. If the time N3' 773 (and/or the time N3" 777) is based on an expected minimum offset associated with the UE 504, in some aspects, the UE 504 may indicate a value for the minimum offset (e.g., an index into an indexed list, a minimum number of symbols, etc.) to the TRP0 702 before the transmission of the pre-grant DCI 760 (e.g., in an RRC configuration message during an initial configuration). Accordingly, the overall timeline for the pre-grant DCI, and specifically a $T_{gap}$ 774 between the end of the pre-grant DCI 760 and the beginning of the PDSCH resources 765, in some aspects, may be configured to allow for all the processing times and minimum offsets associated with the pre-grant DCI 760. In some aspects, a timeline between the PDSCH resources 765 and the associated feedback resources 787 may be unaffected by the use of a pre-grant DCI signaling format.

Figure 8:
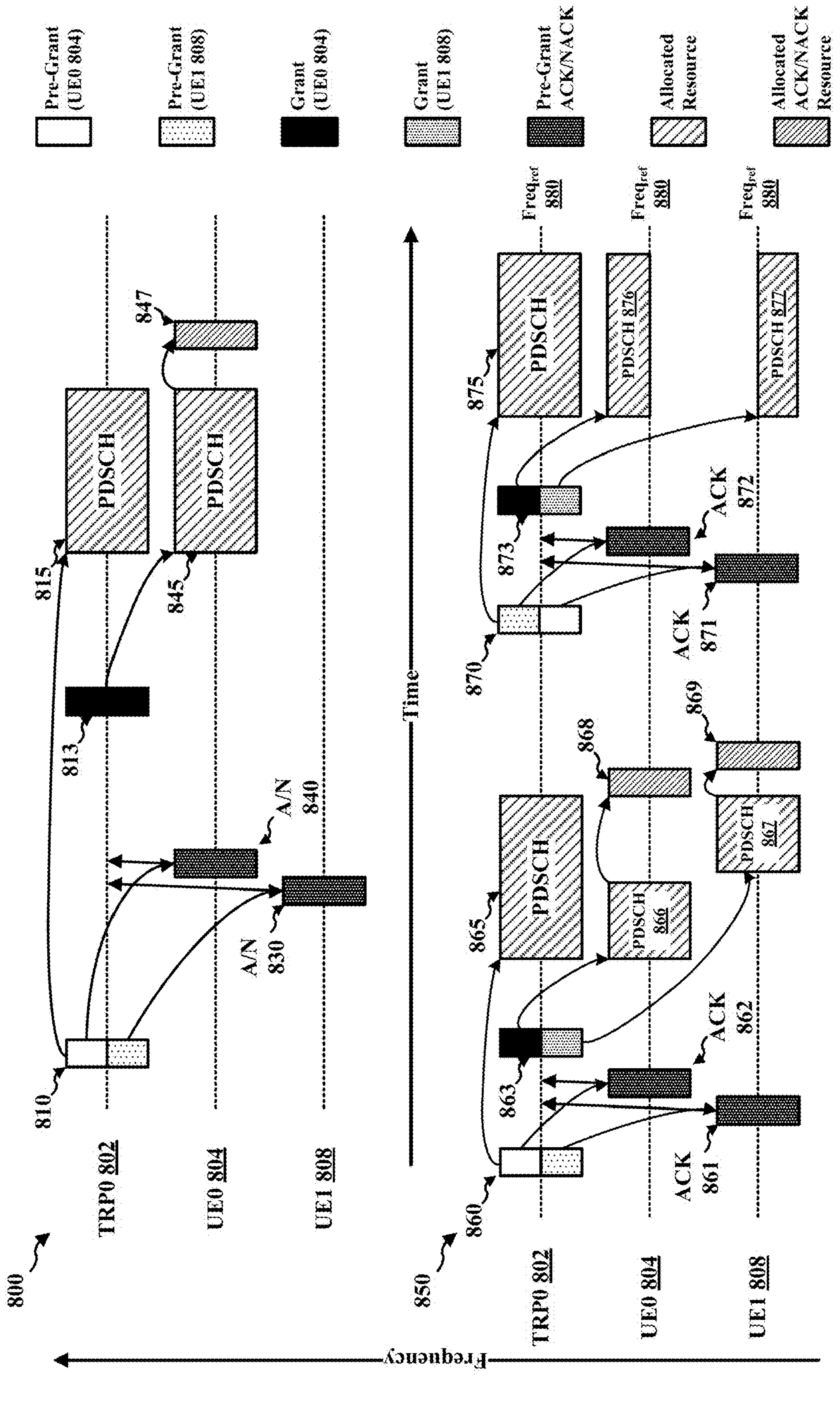
FIG. 8 is a set of diagrams illustrating a TRP using a two-DCI pre-grant signaling format using over-provisioning in accordance with some aspects of the disclosure.

FIG. 8 is a set of diagrams 800 and 850 illustrating a TRP using a two-DCI pre-grant signaling format using over-provisioning in accordance with some aspects of the disclosure. Diagram 800 illustrates that a first TRP, e.g., the TRP0 802, may transmit a pre-grant DCI 810 to a plurality of UEs (e.g., a first UE, e.g., the UE0 804, and a second UE, e.g., the UE1 808) indicating a same set of resources for a PDSCH communication (e.g., PDSCH resources 815). In some aspects, the pre-grant DCI 810 may be a common pre-grant DCI (e.g., associated with a particular RNTI or including information indicating that the pre-grant applies to a group of UEs including the UE0 804 and the UE1 808). The pre-grant DCI 810, in some aspects, may represent a plurality of pre-grant DCIs transmitted during a first time period as separate pre-grant DCIs (e.g., at different times). For example, to transmit the pre-grant DCI 810, the TRP0 802 may transmit a plurality of pre-grant DCIs indicating the same PDSCH resources 815 and different feedback resources for the pre-grant DCI (e.g., feedback resources 830 or feedback resources 840). The indicated PDSCH resources 815, in some aspects, may be associated with a first type of over-provisioning for which the indicated PDSCH resources 815 are over-provisioned in the sense that the same set of PDSCH resources are the subject of multiple pre-grants to multiple UEs despite being ultimately assignable to one UE. Using this first type of over-provisioning, the TRP0 802 may avoid wasting resources (e.g., PDSCH resources 815) associated with a rejected pre-grant. For example, a pre-grant DCI (e.g., pre-grant DCI 810 transmitted to the UE0 804) may be rejected by a first UE (e.g., the UE0 804) and there may not be enough time to transmit an additional pre-grant DCI to another UE (e.g., UE1 808) for those resources such that the resources are not used for any communication.

Based on the pre-grant DCI 810, the UE0 804 and the UE1 808 may determine whether to accept the pre-grant DCI 810. Based on the determination, the UE1 808 may transmit one of an ACK or NACK indicating one of an acceptance or rejection of the pre-grant DCI 810 via the feedback resources 830. Similarly, the UE0 804 may, based on the determination, transmit one of an ACK or NACK indicating one of an acceptance or rejection of the pre-grant DCI 810 via the feedback resources 840. In some aspects, both the UE1 808 and the UE0 804 may transmit an acceptance of the pre-grant DCI 810 and the TRP0 802 may determine which UE to grant the PDSCH resources 815 (and to which UE to transmit a PDSCH communication via the PDSCH resources 815). Accordingly, the TRP0 802 may transmit a grant DCI 813 to UE0 804 granting PDSCH resources 845 (e.g., the same resources as PDSCH resources 815) for a PDSCH communication and granting resources 847 for providing feedback relating to PDSCH resources 845. The TRP0 802 may not transmit, and UE1 808 may not receive, a grant DCI despite indicating an acceptance of the pre-grant DCI 810.

In some aspects, based on the determination, the UE1 808 may transmit one of an ACK or NACK indicating a rejection of the pre-grant DCI 810 via the feedback resources 830 and the UE0 804 may, based on the determination, transmit one of an ACK or NACK indicating an acceptance of the pre-grant DCI 810 via the feedback resources 840. Accordingly, the TRP0 802 may transmit the grant DCI 813 to UE0 804 granting PDSCH resources 845 for a PDSCH communication and granting resources 847 for providing feedback relating to PDSCH resources 845. The TRP0 802 may not transmit, and UE1 808 may not receive, a grant DCI based on indicating the rejection of the pre-grant DCI 810.

Diagram 850 illustrates that the first TRP, e.g., the TRP0 802, may transmit a pre-grant DCI 860 to a plurality of UEs (e.g., the first UE, e.g., the UE0 804, and the second UE, e.g., the UE1 808) indicating a same set of resources for a PDSCH communication (e.g., PDSCH resources 865). In some aspects, the pre-grant DCI 860 may be a common pre-grant DCI (e.g., associated with the particular RNTI or including information indicating that the pre-grant applies to a group of UEs including the UE0 804 and the UE1 808). The pre-grant DCI 860, in some aspects, may represent a plurality of pre-grant DCIs transmitted during a first time period as separate pre-grant DCIs (e.g., at different times). For example, to transmit the pre-grant DCI 860, the TRP0 802 may transmit a plurality of pre-grant DCIs indicating the same PDSCH resources 865 and different feedback resources for the pre-grant DCI (e.g., feedback resources 861 or feedback resources 862). The indicated PDSCH resources 865, in some aspects, may be associated with a second type of over-provisioning for which the indicated PDSCH resources 865 are over-provisioned in the sense that the indicated PDSCH resources 865 may include more resources than will ultimately be granted to any particular UE in the plurality of UEs that received the pre-grant DCI 860.

For example, both the UE0 804 and the UE1 808 may determine to transmit, and transmit, one of an ACK or NACK indicating an acceptance of the pre-grant DCI 860 via the feedback resources 862 and the feedback resource 861, respectively. Based on both the UE0 804 and the UE1 808 transmitting an acceptance of the pre-grant DCI 860, the TRP0 802 may determine to grant separate subsets (e.g., PDSCH resource subset 866 and PDSCH resource subset 867) of the PDSCH resources 865 to each of the UE0 804 and the UE1 808. Accordingly, the TRP0 802 may transmit a set of grant DCIs 863 to UE0 804 and UE1 808 granting PDSCH resource subset 866 and PDSCH resource subset 867 for PDSCH communications with the UE0 804 and the UE1 808, respectively. The PDSCH resource subset 866, in some aspects, may exclude the PDSCH resource subset 867. The set of grant DCIs 863 may further grant feedback resources 868 and feedback resources 869 for providing feedback relating to PDSCH resource subset 866 and PDSCH resource subset 867, respectively. In some aspects, the PDSCH resource subset 866 and the PDSCH resource subset 867 may each occupy a non-overlapping subset of temporal resources across a set of frequencies associated with the PDSCH resources 865 (wherein the set of frequencies is a range of frequencies centered around a first frequency, e.g., $Freq_{ref}$ 880).

Diagram 850 illustrates that the first TRP, e.g., the TRP0 802, may transmit a pre-grant DCI 870 to a plurality of UEs (e.g., the first UE, e.g., the UE0 804, and the second UE, e.g., the UE1 808) indicating a same set of resources for a PDSCH communication (e.g., PDSCH resources 875). In some aspects, the pre-grant DCI 870 may be a common pre-grant DCI (e.g., associated with the particular RNTI or including information indicating that the pre-grant applies to a group of UEs including the UE0 804 and the UE1 808). The pre-grant DCI 870, in some aspects, may represent a plurality of pre-grant DCIs transmitted during a first time period as separate pre-grant DCIs (e.g., at different times). For example, to transmit the pre-grant DCI 870, the TRP0 802 may transmit a plurality of pre-grant DCIs indicating the same PDSCH resources 875 and different feedback resources for the pre-grant DCI (e.g., feedback resources 871 or feedback resources 872). The indicated PDSCH resources 875, in some aspects, may be associated with the second type of over-provisioning for which the indicated PDSCH resources 865 are over-provisioned in the sense that the indicated PDSCH resources 875 may include more resources than will ultimately be granted to any particular UE in the plurality of UEs that received the pre-grant DCI 870.

For example, both the UE0 804 and the UE1 808 may determine to transmit, and transmit, one of an ACK or NACK indicating an acceptance of the pre-grant DCI 870 via the feedback resources 872 and the feedback resource 871, respectively. Based on both the UE0 804 and the UE1 808 transmitting an acceptance of the pre-grant DCI 870, the TRP0 802 may determine to grant separate subsets (e.g., PDSCH resource subset 876 and PDSCH resource subset 877) of the PDSCH resources 875 to each of the UE0 804 and the UE1 808. Accordingly, the TRP0 802 may transmit a set of grant DCIs 873 to UE0 804 and UE1 808 granting PDSCH resource subset 876 and PDSCH resource subset 877 for PDSCH communications with the UE0 804 and the UE1 808, respectively. The set of grant DCIs 873 may further grant feedback resources (not shown) similar to feedback resources 868 and feedback resources 869 for providing feedback relating to PDSCH resource subset 876 and PDSCH resource subset 877, respectively. In some aspects, the PDSCH resource subset 876 and the PDSCH resource subset 877 may each occupy a non-overlapping subset of frequency resources and across overlapping temporal resources associated with the PDSCH resources 875.

While diagram 850 is illustrated in terms of transmitting pre-grant DCIs for two UEs and two communications (e.g., a set of PDSCH resources including two independent subsets of PDSCH resources), the (over-provisioned) pre-grant DCI may be transmitted to a larger number of UEs to make it more likely that at least a number of UEs equal to the number of communications will accept the pre-grant so that no communication resources are unused and/or wasted. Additionally, or alternatively, the indicated PDSCH resources may include a larger number of resource subsets for a correspondingly larger number of communications. The number of UEs receiving a pre-grant DCI for a same set of PDSCH resources, in some aspects, may be larger than the number of resource subsets (or the corresponding number of communications) to allow for some UEs to reject the (over-provisioned) pre-grant DCI while being able to grant the number of resource subsets for the corresponding number of communications (e.g., not wasting resources based on rejected pre-grants). In some aspects, the use of larger sets of indicated PDSCH resources may allow for a larger number of concurrently scheduled communications with the tradeoff that conflicts/collisions may be detected and/or identified based on the larger sets of indicated PDSCH resources even if no conflict/collision would result, or be detected, based on an indication of a smaller set of indicated PDSCH resources (e.g., associated with a smaller number of resource and/or a smaller number of communications).

Figure 9:
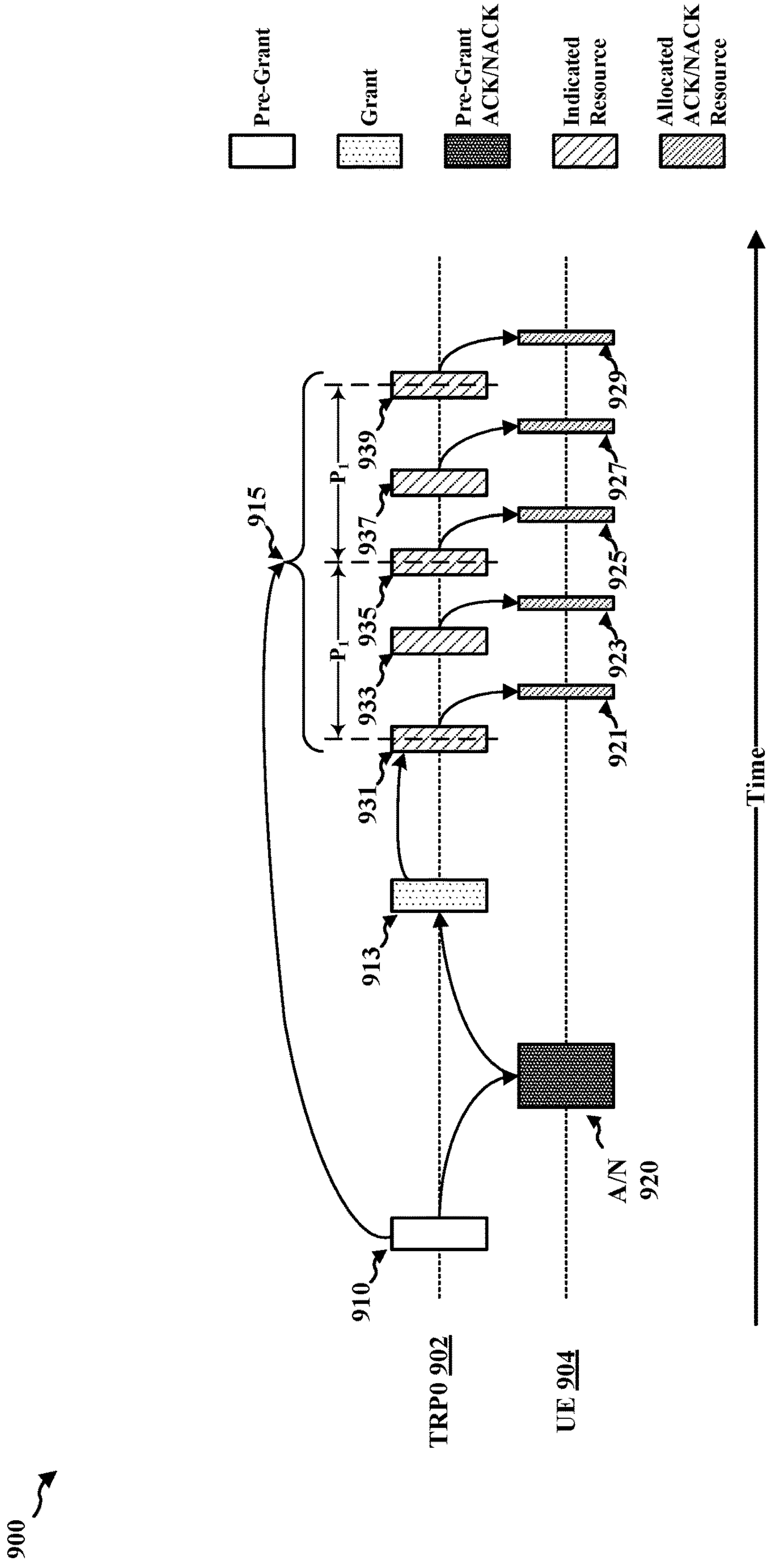
FIG. 9 is a diagram illustrating a pre-grant DCI associated with potential grants and/or reservations for multiple transmissions in accordance with some aspects of the disclosure.

FIG. 9 is a diagram 900 illustrating a pre-grant DCI associated with potential grants and/or reservations for multiple transmissions in accordance with some aspects of the disclosure. In some aspects, a first TRP, the TRP0 902, may transmit a multi-resource pre-grant DCI 910 indicating a pre-grant or reservation for multiple transmissions, which may be referred to as multiple resources, in a set of resources 915. For example, the multi-resource pre-grant DCI 910 may indicate the set of resources 915, e.g., a set of resources including one or more of a first resource 931, a second resource 933, a third resource 935, a fourth resource 937, and a fifth resource 939 for a PDSCH communication and a corresponding one or more of a first feedback resource 921, a second feedback resource 923, a third feedback resource 925, a fourth feedback resource 927, and a fifth feedback resource 929. In some aspects, the set of resources 915 may include the first resource 931, the third resource 935, and the fifth resource 939 which may be occasions of a periodic set of resources with a period P1 (e.g., associated with a first configured set of periodic resources or with a second configured set of semi-persistent scheduled resources). The set of resources 915, in some aspects, may additionally, or alternatively, include the second resource 933 and/or the fourth resource 937 not associated with the periodic set of resources. In some aspects, the multi-resource pre-grant DCI 910 may be associated with a single-DCI pre-grant signaling format or a two-DCI pre-grant signaling format.

In some aspects, the use of a single multi-resource pre-grant DCI 910 to indicate a resource reservation for multiple resources, or multiple transmissions, may provide more efficient signaling because fewer pre-grant DCIs are used to indicate the reservation. The multi-resource pre-grant DCI 910, in some aspects, may indicate, or be associated with, a feedback resource 920. The feedback resource 920, in some aspects, may be configured in a single-indication configuration to include an ACK/NACK associated with the multi-resource pre-grant DCI 910 to accept or decline the set of resources 915 indicated in the multi-resource pre-grant DCI 910 as a whole, e.g., either accepting or rejecting all of the resources (e.g., the set of resources 915) for the multiple transmissions.

In some aspects, the feedback resource 920, in some aspects, may be configured in a multi-indication configuration to include an ACK/NACK associated with each resource in the set of resources 915 associated with the multi-resource pre-grant DCI 910 to accept or decline each of the multiple resources independently (e.g., to individually accept or reject each of the first resource 931, the second resource 933, the third resource 935, the fourth resource 937, and the fifth resource 939 included in the set of resources 915). For the multi-indication configuration of the feedback resource 920, the feedback resource 920 may include a bitmap or other multi-bit indication of a set of accepted and/or rejected reservations (e.g. pre-grants). In some aspects, the feedback may be based on a configuration of a default behavior (e.g., if feedback is not received) and a meaning associated with an ACK or NACK (e.g., whether an ACK, or NACK, indicates an acceptance or a rejection) as described herein, e.g., in relation to FIG. 10 below. For a single-indication configuration for the feedback resource 920, a conflict/collision detection between TRPs, and an associated rejection, may be more likely than a complete rejection of the individual resources for a multi-indication configuration for the feedback resource 920. While the single-indication configuration may be more likely to result in a rejection of the pre-grant reservation (e.g., based on a conflict/collision identified for any one of the multiple resources) and an accompanying waste of resources, a reduced signaling overhead may offset the waste of resources for a sparsely-scheduled UE (e.g., a UE not likely to experience conflicts/collisions based on a percentage of available communication resources used by the UE).

The content of the reservation DCI (e.g., the multi-resource pre-grant DCI 910) may be similar to the pre-grant DCI discussed herein (e.g., in relation to FIGS. 5-8), with the exception that the resource reserved can be for more than one PDSCH. Other aspects of the reservation DCI format (a multi-resource pre-grant DCI format) can follow the aspects described herein for a pre-grant. For example, the multiple resource reservations can be provided in the reservation DCI by adding multiple copies of fields describing the resources to be reserved, e.g., multiple K, multiple SLIV, multiple FDRA, multiple rank, multiple MCS, among other fields. For example, the multiple fields may include one for each of the resources being reserved. The multiple resource reservations can be provided in the reservation DCI by having the same resource in multiple slots being reserved by the DCI, e.g., adding an indication for a number (X) of slots to which the same resources are being reserved along with a single K, a single SLIV, a single FDRA, a single rank, and a single MCS. The reservation DCI, in some aspects, may indicate that starting from slot K, in the next X slots, the same resource defined by the single indicated FDRA, SLIV, rank, and MCS, are being reserved. X can be absolute (e.g., over all slots), or can be counted according to a configured set of candidate slots (e.g., skipping or not counting the slots not in the configured set of candidate slots). In some aspects, the reservation DCI may provide K and X, so the reservation is in slot unit. In some aspects, if the reservation is in a unit of slots, the same reservation DCI may reserve resources for both PDSCH and PUSCH.

Figure 10:
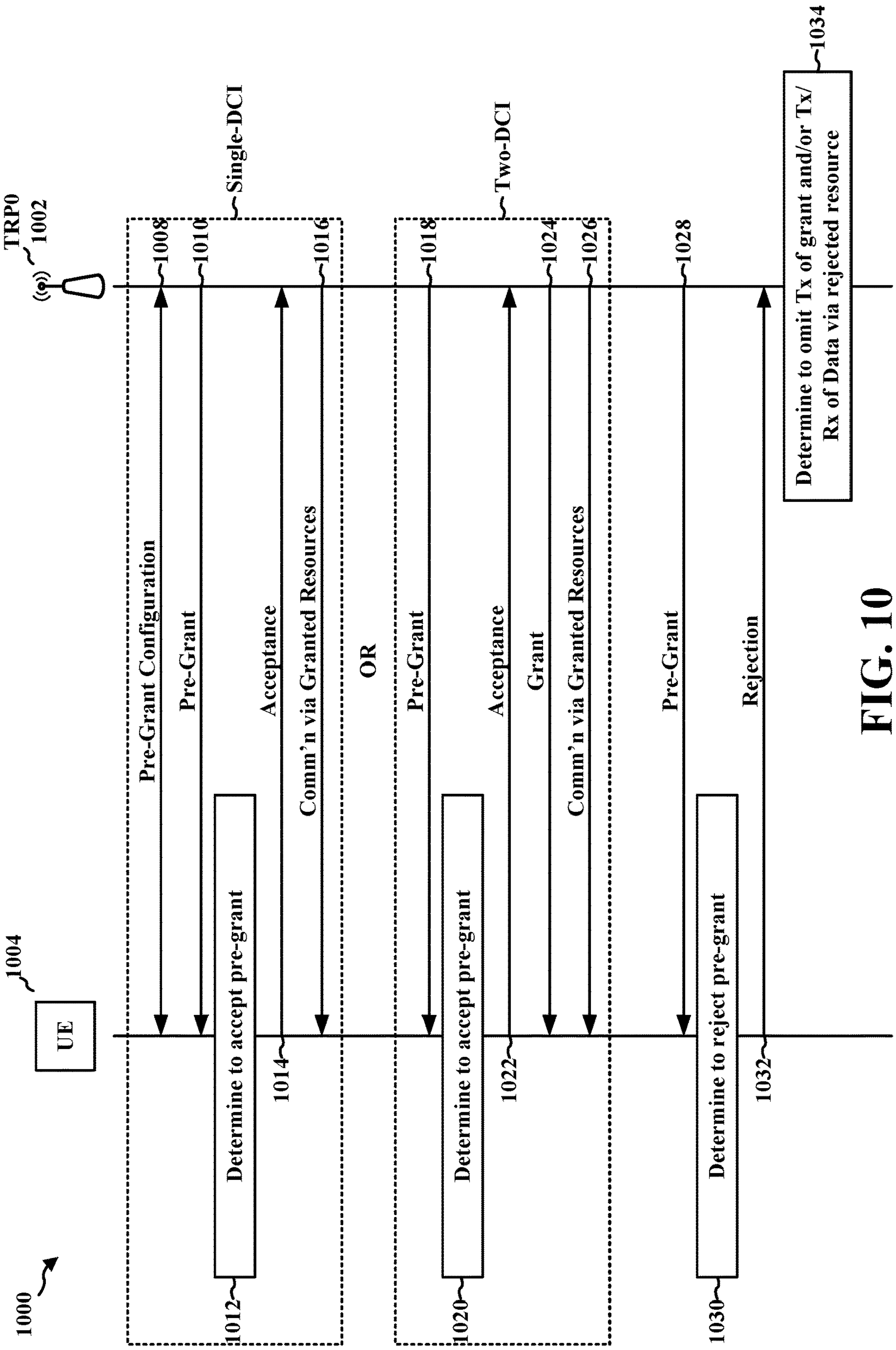
FIG. 10 is a call flow diagram of a method for and using a pre-grant DCI in association with communication between a TRP and a UE in accordance with some aspects of the disclosure.

FIG. 10 is a call flow diagram 1000 of a method for and using a pre-grant DCI in association with communication between a TRP. e.g., the TRP0 1002, and a UE, e.g., the UE 1004, in accordance with some aspects of the disclosure. In some aspects, the TRP0 1002 and the UE 1004 may exchange information associated with a pre-grant configuration 1008. The information exchanged in association with pre-grant configuration 1008, in some aspects, may include an indication of a processing time (e.g., related to the time N1' 712 or 772, the time N3' 713 or 773, the time N2' 776, or the time N3" 777) associated with one or more of the TRP0 1002 or the UE 1004 that affects the expected timeline associated with the pre-grant signaling being configured. In some aspects, the information exchanged in association with pre-grant configuration 1008 may indicate whether the pre-grant signaling being configured uses a single-DCI format or a two-DCI format and may indicate a format for, or the information included in different components of, a pre-grant DCI (e.g., whether the pre-grant signaling reuses a currently-defined DCI format with a different RNTI or set of values indicating that it is a pre-grant or uses a new pre-grant DCI format as described in relation to FIGS. 5 and 6). The information exchanged in association with pre-grant configuration 1008, in some aspects, may further include an indication of a feedback configuration indicating a default behavior if no feedback is received at the TRP0 1002 (e.g., that may be associated with how an ACK or NACK is interpreted) and a format for feedback (e.g., a single, ACK/NACK, bit resource or a multi-bit resource indicating additional information as discussed above in relation to FIGS. 5 and 9).

In some aspects, the information exchanged in association with pre-grant configuration 1008 may indicate that an ACK transmitted in response to a pre-grant DCI indicates no conflict/collision (e.g., an acceptance) while a NACK indicates a conflict/collision detected (e.g., a rejection, where the pre-grant DCI associated with the conflicting/colliding resource is selected for acceptance). In such a configuration, a pre-grant DCI that is not received at UE may lead to no transmission of feedback (or a NACK transmission being included (as a filler) in a HARQ codebook) and a NACK being identified (e.g., based on the NACK being included as part of the HARQ codebook, or based on a default assumption that no feedback be interpreted as a NACK) at the TRP transmitting the pre-grant DCI. Based on the NACK being identified, the TRP may cancel the grant and/or the PDSCH communication associated with the pre-grant DCI and the opportunity may be wasted if there was no actual conflict/collision (e.g., if, had the UE received the pre-grant DCI, the UE would have indicated an acceptance and/or no conflict/collision). In some aspects, the resource may be reused for another UE based on identifying a rejection from the UE that did not receive the transmitted pre-grant DCI. In some aspects, a lack of feedback may be interpreted as an ACK and the TRP may transmit a grant and/or the PDSCH communication associated with the pre-grant DCI.

In some aspects, the information exchanged in association with pre-grant configuration 1008 may indicate that a NACK transmitted in response to a pre-grant DCI indicates no conflict/collision (e.g., an acceptance) while an ACK indicates a conflict/collision detected (e.g., a rejection, where the pre-grant DCI associated with the conflicting/colliding resource is selected for acceptance). In such a configuration, a pre-grant DCI that is not received at UE may lead to no transmission of feedback (or a NACK transmission being included (as a filler) in a HARQ codebook) and a NACK being identified (e.g., based on the NACK being included as part of the HARQ codebook, or based on a default assumption that no feedback be interpreted as a NACK) at the TRP transmitting the pre-grant DCI. Based on the NACK being identified, the TRP may transmit a grant (in a two-DCI pre-grant signaling format) and the PDSCH communication that may, or may not, conflict/collide with another communication that may have been identified based on the pre-grant DCI. Accordingly, there may be resource waste in the case of a conflict/collision with another communication. However, if there was no conflict/collision, the UE may receive the PDSCH communication successfully. In some aspects, a lack of feedback may be interpreted as an ACK and the TRP may cancel the grant and/or the PDSCH communication associated with the pre-grant DCI and the opportunity may be wasted if there was no actual conflict/collision (e.g., if, had the UE received the pre-grant DCI, the UE would have indicated an acceptance and/or no conflict/collision). In some aspects, the resource may be reused for another UE based on canceling the PDSCH communication for the UE that did not receive a transmitted pre-grant DCI. The configuration of the default behavior, or assumption, may be based on whether the wasting resources (e.g., via conflicts/collisions) or wasting opportunities is determined to be of greater concern for the system (e.g., a network including at least the TRP).

In the previous examples, the feedback (e.g., an ACK or NACK) for the pre-grant DCI was able to be transmitted, e.g., there was no conflict/collision between the feedback resource and another communication. However, in some aspects, the feedback resources may conflict/collide with another communication (or a feedback resource for a different pre-grant DCI), e.g., the UE may not be capable of (e.g., may not support) simultaneous UL transmission and the feedback resource may conflict/collide with one of a PUSCH or PUCCH communication. In some aspects, the UE may not support transmission of the feedback and the conflicting/colliding communication (e.g., feedback). The UE, in some aspects, may follow dropping rule for general feedback to determine which of the conflicting/colliding communications to drop. If the feedback for a pre-grant DCI is dropped, the discussion above regarding a default assumption and behavior is applicable. In some aspects, the UE may apply one or more dropping rules that is specific to feedback for a pre-grant. For example, if omitted feedback is interpreted as, or assumed to be, a NACK (and a NACK is associated with canceling the resources and/or communication associated with the pre-grant DCI), some aspects, may assign a lower priority for the feedback (e.g., for a PUCCH carrying the ACK/NACK for a pre-grant DCI) compared to other PUCCH transmissions that might otherwise have a same priority. Additionally, or alternatively, a new rule indicating for a UE to drop a feedback (e.g., the PUCCH carrying the feedback) for a pre-grant DCI in favor of another PUCCH communication with a same priority that is not associated with a feedback for a pre-grant DCI.

The information exchanged in association with pre-grant configuration 1008 may further indicate, or be associated with, the behavior of a TRP (e.g., the TRP0 1002) when receiving, from a UE (e.g., the UE 1004) a rejection (e.g., a NACK) in response to a pre-grant DCI. In some aspects, the TRP may be configured to cancel the PDSCH transmission (and associated grant DCI when using a two-DCI pre-grant signaling format). The TRP may further be configured to attempt to reuse the rejected and/or canceled resource for one or more other UEs. For example, if the time remaining before the associated PDSCH resources is longer than a pre-grant timeline, e.g., based on N1'+N3' as described in relation to FIG. 7, the TRP may transmit a subsequent pre-grant DCI for the same PDSCH resources. If the time remaining before the associated PDSCH resources is shorter than a pre-grant timeline, the TRP may transmit a grant DCI to another UE (e.g., a UE operating in a grant mode instead of a pre-grant mode) to schedule a different PDSCH communication. This may avoid wasting resources at the TRP. In some aspects, the NACK may also trigger a backoff period and/or time for the rejecting UE during which the TRP may not attempt to schedule communication based on an assumption that the conflict/collision may persist during at least the backoff period. The implementation of the backoff period and/or time may depend on many local factors that may be included in the information exchanged in association with pre-grant configuration 1008. In some aspects using, or including, feedback indicating a type of conflict/collision and/or a suggested remedy (e.g., an increased K1 value, new K2 value, a suggested backoff time), a specific backoff period and/or time may be based on the information included in the feedback.

In some aspects, the pre-grant configuration 1008 may indicate a single-DCI pre-grant signaling format and the TRP0 1002 may transmit, and UE 1004 may receive, a pre-grant 1010. Accordingly, in some aspects, the pre-grant 1010 may be a pre-grant DCI (such as pre-grant DCI 510 or pre-grant DCI 520) associated with the a single-DCI pre-grant format indicating a corresponding set of resources for a DL channel (e.g., a PDSCH, a PDCCH, etc.). The pre-grant 1010, in some aspects, may include all the information included in a normal DL grant as well as additional information relating to a time offset (e.g., a value K1' similar to a K1 value between a granted resource and a corresponding feedback resource) between the pre-grant 1010 and a feedback resource (e.g., a resource associated with an acceptance 1014 of the pre-grant 1010), a priority, a total DAI, and/or a counter DAI for the feedback resource (where the total DAI and counter DAI may be associated with a type 2 HARQ codebook).

Based on the information included in pre-grant 1010, the UE 1004, in some aspects, may determine, at 1012, to accept the pre-grant 1010 and may transmit (or otherwise indicate)

an acceptance 1014 received by the TRP0 1002. The acceptance 1014, in some aspects, may be transmitted as an ACK or a NACK via a dedicated feedback resource indicated in pre-grant 1010 as described above in relation to the possible configurations for the default behavior and the meaning of particular feedback (and in relation to, e.g., feedback resource 530 of FIG. 5 above). In some aspects, acceptance 1014 may be indicated by omitting a transmission via the dedicated feedback resource. Based on the acceptance 1014, the TRP0 1002 may transmit, and UE 1004 may receive, communication 1016 via the resources indicated in the pre-grant 1010.

In some aspects, the pre-grant configuration 1008 may indicate a two-DCI pre-grant signaling format and the TRP0 1002 may transmit, and UE 1004 may receive, a pre-grant 1018. Accordingly, in some aspects, the pre-grant 1018 may be a pre-grant DCI (such as pre-grant DCI 560 or pre-grant DCI 570) associated with the a two-DCI pre-grant format indicating a corresponding set of resources for a DL channel (e.g., a PDSCH, a PDCCH, etc.). The pre-grant 1018, in some aspects, may include at least a limited set of information used to identify and/or detect a conflict/collision based on the capabilities of the UE 1004 and the additional information relating to the feedback resource (e.g., a value K1', a priority, a total DAI, and/or a counter DAI) for transmitting acceptance 1022 as discussed above in relation to FIG. 5.

Based on the information included in pre-grant 1018, the UE 1004, in some aspects, may determine, at 1020, to accept the pre-grant 1018 and may transmit (or otherwise indicate) an acceptance 1022 received by the TRP0 1002. The acceptance 1022, in some aspects, may be transmitted as an ACK or a NACK via a dedicated feedback resource indicated in pre-grant 1018 as described above in relation to the possible configurations for the default behavior and the meaning of particular feedback (and in relation to, e.g., feedback resource 530 of FIG. 5 above). In some aspects, acceptance 1022 may be indicated by omitting a transmission via the dedicated feedback resource. Based on the acceptance 1022, the TRP0 1002 may transmit, and UE 1004 may receive, grant 1024 and communication 1026 via the resources indicated in the grant 1024. In some aspects, the grant 1024 may include at least the information not included in the pre-grant 1018 using a new DCI format or using a known DCI format (e.g., Format 1_0, or Format 1_2). As described in relation to FIGS. 5 and 6, the grant 1024 may be an independent DCI or a piggybacked DCI and may include information used to decode the communication 1026.

After transmitting the communication 1016 or the communication 1026 (depending on whether the pre-grant configuration 1008 indicated a single-DCI pre-grant signaling format or a two-DCI pre-grant signaling format), the TRP0 1002 may transmit, and the UE 1004 may receive, an additional pre-grant 1028. The additional pre-grant 1028, in some aspects, may be equivalent (e.g., in format) to one of the pre-grant 1010 or the pre-grant 1018. Based on the additional pre-grant 1028, the UE 1004 may determine, at 1030, to reject the pre-grant. For example, if another conflicting/colliding pre-grant was received from another TRP (not show), the UE 1004 may determine, at 1030, to reject the pre-grant 1028. The UE 1004 may then transmit (or otherwise indicate), and the TRP0 1002 may receive or detect, the rejection 1032. Based on the rejection 1032. TRP0 1002 may, at 1034, determine to omit, or skip, a transmission of a grant (e.g., for a two-DCI pre-grant signaling format) and/or a transmission of a communication associated with the pre-grant 1028 (e.g., for both the single-DCI pre-grant signaling format and the two-DCI pre-grant signaling format).

In some aspects, a feedback (e.g., acceptance 1022 or rejection 1032) may be omitted, or skipped, based on a conflict and/or collision between the feedback transmission and one or more other communications (e.g., DL or UL communication with higher priority) where the rules for which communication to omit or skip may be based on one or more of a capacity of the UE for simultaneous transmissions and/or simultaneous reception and transmission, a relative priority of the communication and the feedback (as defined in a pre-grant such as pre-grant DCI 510 or pre-grant 1010 for a single-DCI pre-grant format), and a default behavior in the absence of feedback.

Figure 11:
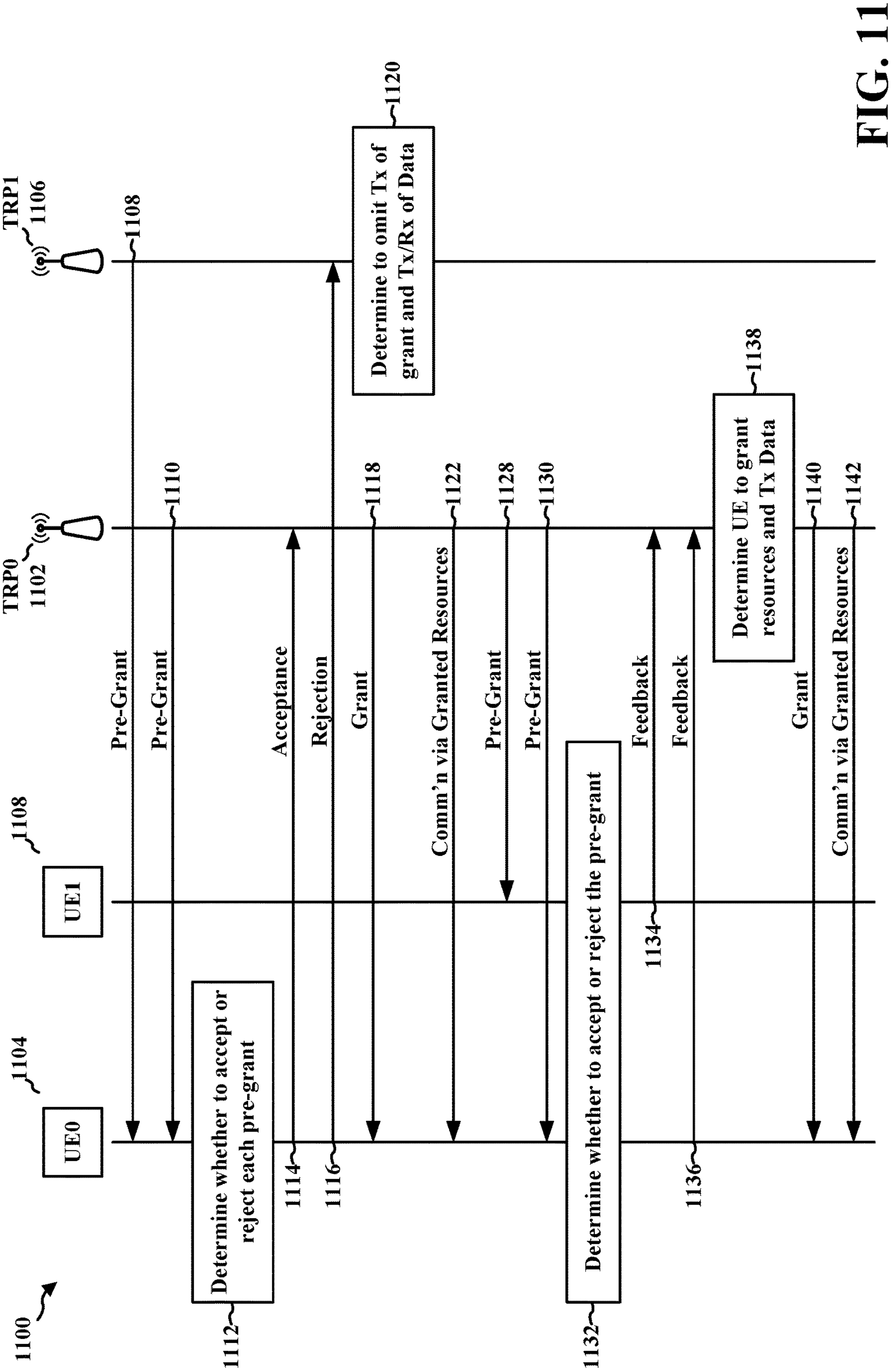
FIG. 11 is a call flow diagram of a method for and using a pre-grant DCI in association with communication between first and second TRPs and first and second UEs in accordance with some aspects of the disclosure.

FIG. 11 is a call flow diagram 1100 of a method for and using a pre-grant DCI in association with communication between first and second TRPs, e.g., the TRP0 1102 and the TRP1 1106, and first and second UEs, e.g., the UE0 1104 and the UE1 1103, in accordance with some aspects of the disclosure. In some aspects, the TRP0 1102, the TRP1 1106, the UE0 1104, and the UE1 1103 may exchange information associated with a pre-grant configuration as described in relation to pre-grant configuration 1008 of FIG. 10.

Call flow diagram 1100 assumes that a pre-grant configuration indicates (or the network is configured to use) a two-DCI pre-grant signaling format. The TRP0 1102 may transmit, and UE0 1104 may receive, a (first) pre-grant 1108 (e.g., a pre-grant DCI as described above) for a first set of PDSCH resources (e.g., associated with a (subsequent) communication 1122). The TRP1 1106 may also transmit, and UE0 1104 may receive, a (second) pre-grant 1110 (e.g., a pre-grant DCI as described above) for the same first set of PDSCH resources or set of resources conflicting/colliding with the first set of PDSCH resources (e.g., associated with the subsequent communication 1122). The UE0 1104, may, at 1112, determine whether to accept or reject each of the (first) pre-grant 1108 and/or the (second) pre-grant 1110 based on the information included in the (first) pre-grant 1108 and the (second) pre-grant 1110. The determination at 1112 may be based on the considerations discussed above in relation to FIGS. 5-9. For example, the UE0 1104 may, at 1112, determine to accept the pre-grant 1110 and reject the pre-grant 1108. Based on the determination at 1112, the UE0 1104, in some aspects, may transmit (or otherwise indicate) an acceptance 1114 received by the TRP0 1102 and may also transmit (or otherwise indicate) a rejection 1116 received by the TRP1 1106. The acceptance 1114 (or rejection 1116), in some aspects, may be transmitted as an ACK or a NACK via a dedicated feedback resource indicated in the pre-grant 1108 (or the pre-grant 1110) as described above in relation to the possible configurations for the default behavior and the meaning of particular feedback (and in relation to, e.g., feedback resource 530 of FIG. 5 above). In some aspects, acceptance 1114 (or rejection 1116) may be indicated by omitting a transmission via the dedicated feedback resource.

In some aspects, based on the rejection 1116, the TRP1 1106 may determine, at 1120, to omit, or skip, a transmission of a grant and/or a subsequent communication associated with the pre-grant 1108. Based on the acceptance 1114, the TRP0 1102, in some aspects, may transmit, and UE0 1104 may receive, grant 1118 and the subsequent communication 1122 via the resources indicated in the grant 1118. In some aspects, the grant 1118 may include at least the information not included in the pre-grant 1110 using a new DCI format or using a known DCI format (e.g., Format 1_0, or Format 1_2). As described in relation to FIGS. 5 and 6, the grant

1118 may be an independent DCI or a piggybacked DCI and may include information used to decode the subsequent communication 1122. For a single-DCI pre-grant signaling format, the grant 1118 may be omitted and the information for decoding the subsequent communication 1122 may be included in pre-grant 1110.

After transmitting the communication 1122, the TRP0 1102 may transmit, and the UE0 1104 may receive, a pre-grant 1128 (e.g., a first over-provisioning pre-grant). The TRP0 1102 may also transmit, and the UE1 1103 may receive, a pre-grant 1130 (e.g., a second over-provisioning pre-grant). Each of the UE0 1104 and the UE1 1103 may independently determine, at 1132, whether to accept or reject the over-provisioning pre-grant received from the TRP0 1102. Based on the independent determination made by the UE0 1104 at 1132, the UE0 1104 may transmit, and the TRP0 1102 may receive, feedback 1134. The feedback 1134 may be one of an acceptance or a rejection of the pre-grant 1128 (e.g., an over-provisioning pre-grant), e.g., based on the considerations discussed above. Similarly, based on the independent determination made by the UE1 1103 at 1132, the UE1 1103 may transmit, and the TRP0 1102 may receive, feedback 1136. The feedback 1136 may be one of an acceptance or a rejection of the pre-grant 1130 (e.g., an over-provisioning pre-grant), e.g., based on the considerations discussed above. The TRP0 1102 based on the feedback 1134 and the feedback 1136, the TRP0 1102 may determine, at 1138, whether to transmit a grant and/or a communication to the UE0 1104 or the UE1 1103.

For example, if one of the over-provisioning pre-grants is accepted (e.g., pre-grant 1130) and the other over-provisioning pre-grant (e.g., pre-grant 1128) is rejected, the TRP0 1102 may transmit a grant (and/or communication) based on the accepted over-provisioning pre-grant and omit, or skip, the transmission of a grant (and/or communication) based on the rejected over-provisioning pre-grant. Additionally, or alternatively, the TRP0 1102 may transmit a grant (and/or communication) to one UE and omit, or skip, the transmission of a grant (and/or communication) to the other UE if both over-provisioning pre-grants are accepted and the TRP0 1102 determines, at 1138, to transmit the grant and/or communication only to the UE0 1104. For example, call flow diagram 1100 illustrates that the TRP0 1102 may transmit grant 1140 and communication 1142 based on the feedback 1136 indicating an acceptance of the pre-grant 1130. In some aspects, both the UE0 1104 and the UE1 1103 may transmit an acceptance via the corresponding feedback 1136 and feedback 1134, respectively. The TRP0 1102 based on the acceptance indicated in both feedback 1134 and the feedback 1136, the TRP0 1102 may determine whether to transmit a grant and/or a communication to both the UE0 1104 and the UE1 1103 or to one of the UE0 1104 or the UE1 1103. For example, similarly to the over-provisioning described in FIG. 8, in some aspects, an additional grant and/or communication may be transmitted by the TRP0 1102 and received by the UE1 1103, where the grant 1140 (and the communication 1142) may be associated with a first subset of resources indicated in the over-provisioning pre-grants and the additional grant (and the additional communication) may be associated with a second subset of resources indicated in the over-provisioning pre-grants.

As discussed herein, e.g., in relation to FIG. 10, in some aspects, a feedback (e.g., acceptance 1114 or rejection 1116, or feedback 1134 or feedback 1136) may be omitted, or skipped, based on a conflict and/or collision between the feedback transmission and one or more other communications (e.g., DL or UL communication with higher priority) where the rules for which communication to omit or skip may be based on one or more of a capacity of the UE for simultaneous transmissions and/or simultaneous reception and transmission, a relative priority of the communication and the feedback (as defined in a pre-grant such as pre-grant DCI 510 or pre-grant 1010 for a single-DCI pre-grant format), and a default behavior in the absence of feedback.

Figure 12:
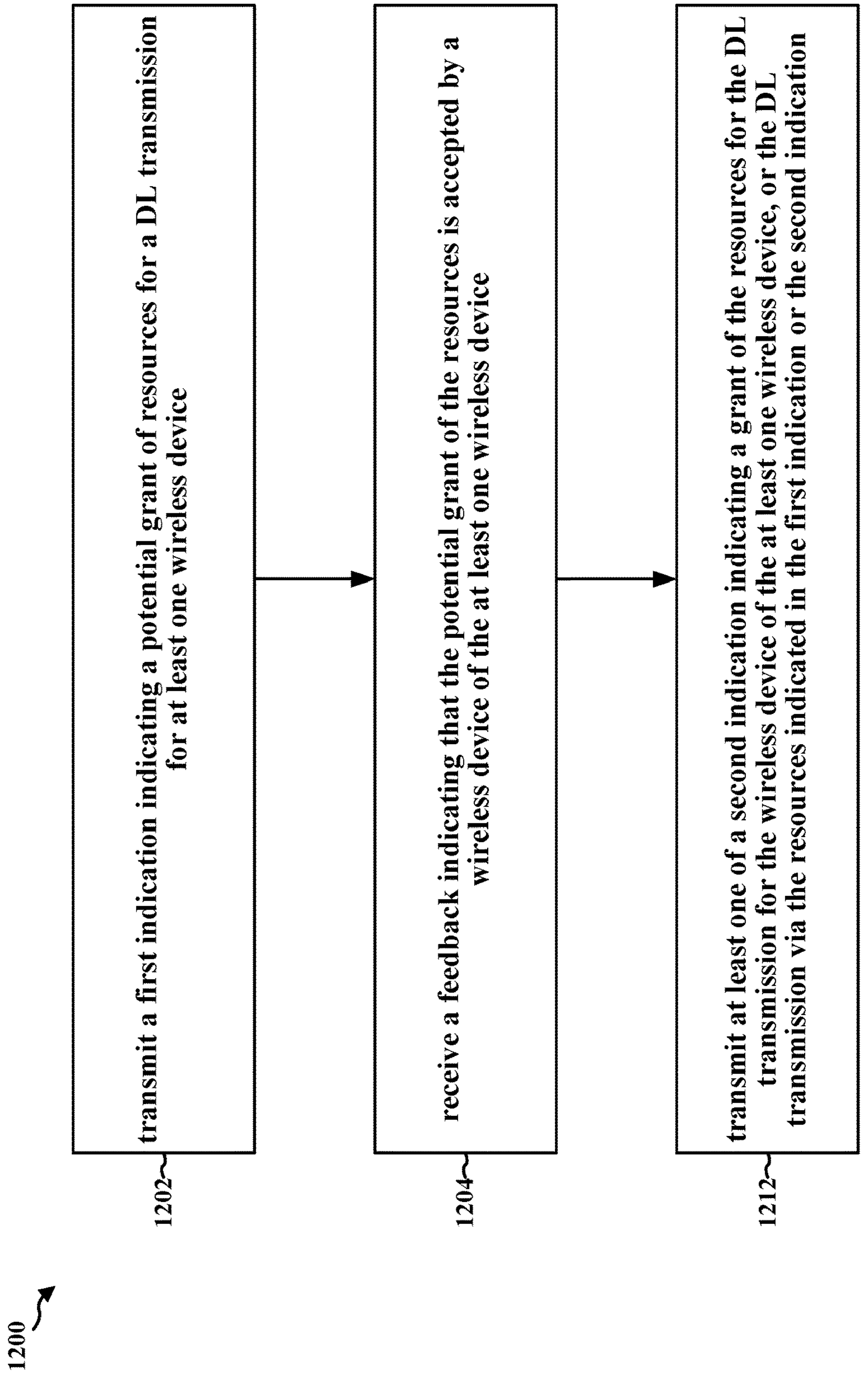
FIG. 12 is a flowchart of a method of wireless communication.

FIG. 12 is a flowchart 1200 of a method of wireless communication. The method may be performed by a base station or network device, e.g., a base station or network device associated with one of a first or second TRP (e.g., the base station 102; the TRP0 402, the TRP1 406, the TRP0 502, the TRP1 506, the TRP0 602, the TRP1 606, the TRP0 702, the TRP0 802, the TRP0 902, the TRP0 1002, the TRP0 1102, the TRP1 1106; the network entity 1602 or the network entity 1702). At 1202, the network device (e.g., a network device associated with a first TRP, such as TRP0 402, 502, 602, 702, 802, 902, 1002, or 1102) may transmit a first indication indicating a potential grant of resources for a DL transmission for at least one wireless device. For example, 1202 may be performed by CU processor 1712, DU processor 1732, RU processor 1742, transceiver(s) 1746, antenna(s) 1780, and/or pre-grant DCI component 199 of FIG. 17. The first indication, in some aspects, may be a first DCI indicating a first set of parameters associated with the potential grant and a second set of parameters associated with the feedback. In some aspects, the first indication may be included in a plurality of indications and the at least one wireless device may include a plurality of wireless devices. In some aspects, the resources indicated in the first indication (or potential grant) follows the first indication by at least a first amount of time and the first amount of time may be at least equal to a second amount of time between the first indication and a feedback resource indicated for the feedback and a third amount of time between the feedback resource and the resources indicated in the potential grant. The third amount of time, in some aspects, may include a fourth amount of time between the feedback resource and a second indication (transmitted at 1212) and a fifth amount of time between the second indication and the resources indicated in the potential grant. For example, referring to FIGS. 5-11, a TRP (e.g., TRP0 402, 502, 602, 702, 802, 902, 1002, or 1102) may transmit at least one pre-grant DCI (e.g., pre-grant DCI 510, 560, 660, 710, 760, 810, 860, 870, or 910) or pre-grant (e.g., pre-grant 1010, 1018, 1028, 1110, 1128, or 1130) indicating resources (e.g., feedback resources 530, 580, 680, 730, 780, 830, 861, 871, or 920) for feedback (e.g., acceptance 1014, 1022, or 1114; or feedback 1134 or 1136) and/or resources (e.g., PDSCH resources 515, 565, 665, 715, 765, 815, 865, or 875; or the set of resources 915) for a communication (e.g., communication 1016, 1026, 1122, or 1142).

In some aspects, the first set of parameters may be based on a capability of the wireless device and may include one or more of a slot index (e.g., a K value), a start and length indicator (e.g., a SLIV), a frequency (e.g., an FDRA), a rank, an antenna port assignment, an MCS, a priority associated with the DL transmission, a time to expiration, or a sequence number. In some aspects, the first set of parameters may be used by a wireless device receiving the at least one indication to determine whether one or more other potential grants conflict with the potential grant or to determine which of a set of conflicting potential grants to accept. The first DCI, in some aspects, may be a pre-grant DCI transmitted with information for the wireless device to determine whether the potential grant of resources conflicts with the one or more other potential grants. The second set of parameters associated with the feedback, in some aspects, may include one or more of a time offset between the first indication to the feedback, a priority indicator associated with the feedback, or a DAI.

At 1204, the network device may receive a feedback indicating that the potential grant of the resources is accepted by a wireless device of the at least one wireless device. For example, 1204 may be performed by CU processor 1712, DU processor 1732, RU processor 1742, transceiver(s) 1746, antenna(s) 1780, and/or pre-grant DCI component 199 of FIG. 17. Referring to FIGS. 5-11, for example, the TRP (e.g., TRP0 502, 602, 702, 802, 902, 1002, or 1102) may receive feedback (e.g., acceptance 1014, 1022, or 1114; or feedback 1134 or 1136) via a set of indicated resources (e.g., feedback resources 580, 680, 730, 780, 840, 862, 872, or 920) indicating an acceptance of an associated pre-grant DCI (e.g., pre-grant DCI 560, 660, 710, 760, 810, 860, 870, or 910) or pre-grant (e.g., pre-grant 1010, 1018, 1110, 1128, or 1130).

In response to receiving the feedback at 1204, the network device may transmit, at 1212, at least one of a second indication indicating a grant of the resources for the DL transmission for the wireless device of the at least one wireless device, or the DL transmission via the resources indicated in the first indication or the second indication. For example, 1212 may be performed by CU processor 1712, DU processor 1732, RU processor 1742, and/or pre-grant DCI component 199 of FIG. 17. In some aspects, the second indication is a second DCI including a third set of parameters associated with the grant, and the third set of parameters includes parameters associated with one or more of receiving or decoding the DL transmission not included in the first set of parameters. In some aspects, the second DCI may be an independent DCI transmitted before the resources for the DL transmission indicated in the first indication, or a DCI transmitted via the resources indicated in the first indication. In some aspects, the pre-grant DCI (or first DCI) may be one of (1) a different length than the second DCI, (2) a same length as the second DCI based on a padding (e.g., of the first and/or second DCI) but associated with a different RNTI than the second DCI, or (3) the same length as the second DCI based on the padding, wherein the second DCI is associated with a same RNTI as the first DCI and one or both of the first DCI and the second DCI include a set of values for a subset of parameters indicating that the first DCI or the second DCI is associated with a pre-grant signaling format. For example, referring to FIGS. 5-11, the TRP (e.g., TRP0 402, 502, 602, 702, 802, 902, 1002, or 1102; or TRP1 1106) may transmit a grant (e.g., grant DCI 563, 763, 813, or 913; piggybacked DCI 663; the set of grant DCIs 863 or 873; or grant 1024, 1118, or 1140) and/or a communication (e.g., communication 1016, 1026, 1122, or 1142) based on the feedback (e.g., acceptance 1014, 1022, or 1114; or feedback 1134 or 1136) indicating the acceptance.

After transmitting, at 1212, the at least one of the second indication indicating the grant of the resources for the DL transmission for the wireless device of the at least one wireless device, or the DL transmission via the resources indicated in the first indication or the second indication, the network device may perform the method again for a subsequent set of resources that may be accepted or rejected as described in relation to pre-grant 1028 or FIG. 10 or in relation to pre-grants 1110 and pre-grants 1128 and 1130 of FIG. 11.

Figure 13:
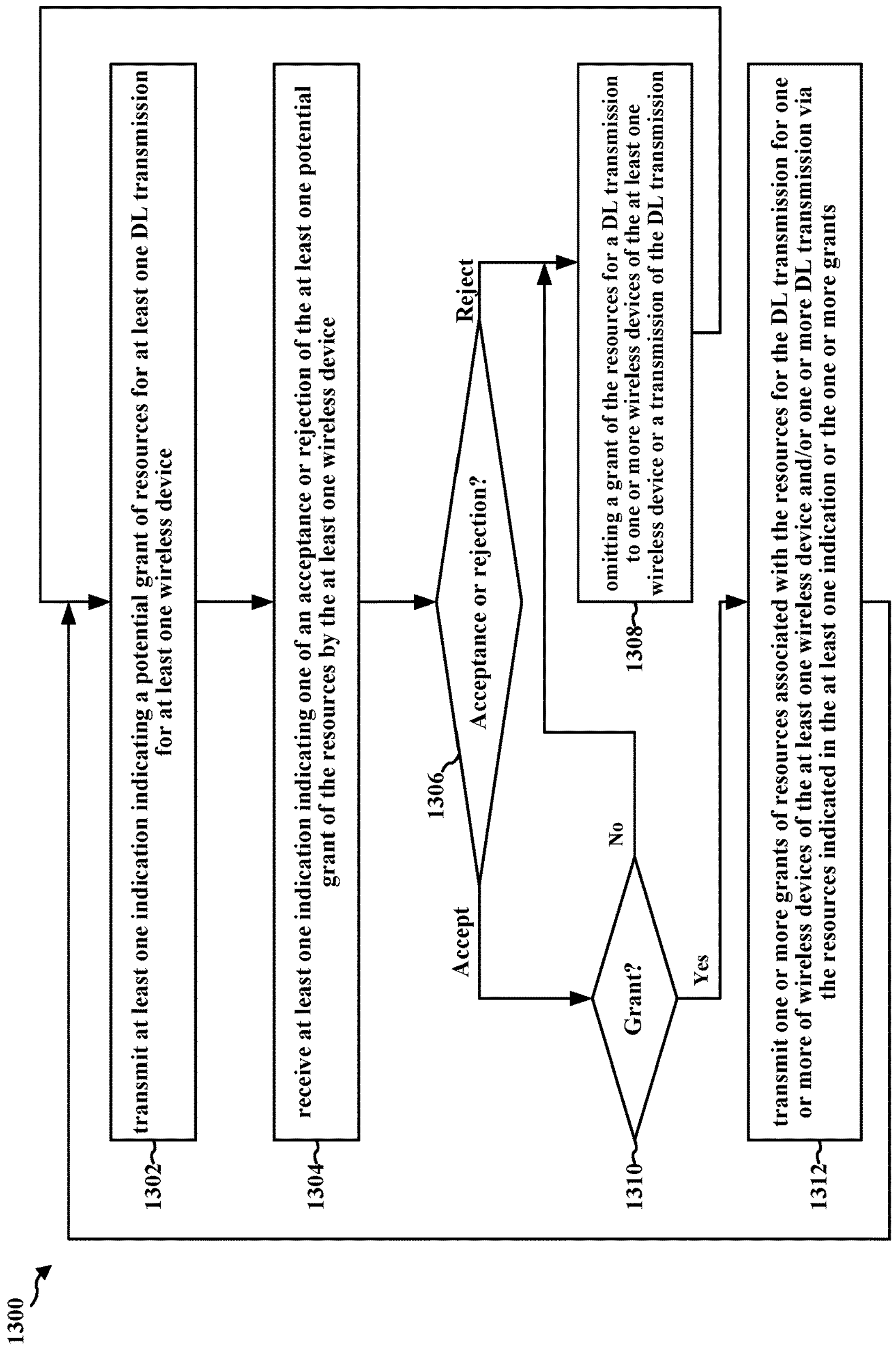
FIG. 13 is a flowchart of a method of wireless communication.

FIG. 13 is a flowchart 1300 of a method of wireless communication. The method may be performed by a base station or network device, e.g., a base station or network device associated with one of a first or second TRP (e.g., the base station 102; the TRP0 402, the TRP1 406, the TRP0 502, the TRP1 506, the TRP0 602, the TRP1 606, the TRP0 702, the TRP0 802, the TRP0 902, the TRP0 1002, the TRP0 1102, the TRP1 1106; the network entity 1602 or the network entity 1702). At 1302, the network device (e.g., a network device associated with a first TRP, such as TRP0 402, 502, 602, 702, 802, 902, 1002, or 1102) may transmit at least one indication (e.g., a first indication) indicating a potential grant of resources (e.g., PDSCH resources) for at least one DL communication for at least one wireless device. For example, 1302 may be performed by CU processor 1712. DU processor 1732, RU processor 1742, transceiver(s) 1746, antenna(s) 1780, and/or pre-grant DCI component 199 of FIG. 17. The at least one indication, in some aspects, may be a first DCI indicating a first set of parameters associated with the potential grant and a second set of parameters associated with the feedback. The at least one indication and the at least one wireless device, in some aspects, may include a plurality of indications and a plurality of wireless devices, respectively. In some aspects, the resources indicated in the at least one (or first) indication (or potential grant) follows the at least one (or first) indication by at least a first amount of time and the first amount of time may be at least equal to a second amount of time between the first indication and a feedback resource indicated for the feedback and a third amount of time between the feedback resource and the resources indicated in the potential grant. The third amount of time, in some aspects, may include a fourth amount of time between the feedback resource and a second indication (transmitted at 1312) and a fifth amount of time between the second indication and the resources indicated in the potential grant. For example, referring to FIGS. 5-11, a TRP (e.g., TRP0 402, 502, 602, 702, 802, 902, 1002, or 1102) may transmit at least one pre-grant DCI (e.g., pre-grant DCI 510, 560, 660, 710, 760, 810, 860, 870, or 910) or pre-grant (e.g., pre-grant 1010, 1018, 1028, 1110, 1128, or 1130) indicating resources (e.g., feedback resources 530, 580, 680, 730, 780, 830, 861, 871, or 920) for feedback (e.g., acceptance 1014, 1022, or 1114; or feedback 1134 or 1136) and/or resources (e.g., PDSCH resources 515, 565, 665, 715, 765, 815, 865, or 875; or the set of resources 915) for a communication (e.g., communication 1016, 1026, 1122, or 1142).

In some aspects, the first set of parameters may be based on a capability of the wireless device and may include one or more of a slot index (e.g., a K value), a start and length indicator (e.g., a SLIV), a frequency (e.g., an FDRA), a rank, an antenna port assignment, an MCS, a priority associated with the DL transmission, a time to expiration, or a sequence number. In some aspects, the first set of parameters may be used by a wireless device receiving the at least one indication to determine whether one or more other potential grants conflict with the potential grant or to determine which of a set of conflicting potential grants to accept. The first DCI, in some aspects, may be a pre-grant DCI transmitted with information for the wireless device to determine whether the potential grant of resources conflicts with the one or more other potential grants. The second set of parameters associated with the feedback, in some aspects, may include one or more of a time offset between the at least one (e.g., the first) indication to the feedback, a priority indicator associated with the feedback, or a DAI.

At 1304, the network device may receive at least one indication indicating one of an acceptance or rejection of the at least one potential grant of the resources by the at least one wireless device. In some aspect in which the at least one indication indicating a potential grant of resources includes a plurality of indications transmitted to a plurality of wireless devices, the at least one indication indicating one of an acceptance or rejection may include a plurality of corresponding indications. For example, 1304 may be performed by CU processor 1712, DU processor 1732, RU processor 1742, transceiver(s) 1746, antenna(s) 1780, and/or pre-grant DCI component 199 of FIG. 17. In some aspects, the network device, at 1304, may receive a feedback indicating that the potential grant of the resources is accepted (or rejected) by a (first) wireless device of the at least one wireless device and/or may receive an additional feedback indicating that the potential grant of the resources is accepted (or rejected) by a (second) wireless device of the at least one wireless device. The at least one indication indicating one of an acceptance or rejection of the at least one potential grant of the resources, in some aspects, may be received as discussed herein. In some aspects, an indication indicating that the potential grant of the resources is rejected may include an indication of a reason for the rejection (and a suggestion for a potential remedy). For example, referring to FIGS. 5-11, the TRP (e.g., TRP0 402, 502, 602, 702, 802, 902, 1002, or 1102) may receive feedback (e.g., acceptance 1014, 1022, or 1114; or feedback 1134 or 1136) via a set of indicated resources (e.g., feedback resources 530, 580, 680, 730, 780, 830, 861, 871, or 920) indicating one of an acceptance or rejection of an associated pre-grant DCI (e.g., pre-grant DCI 510, 560, 660, 710, 760, 810, 860, 870, or 910) or pre-grant (e.g., pre-grant 1010, 1018, 1028, 1110, 1128, or 1130).

At 1306, the network device may determine for each indication received at 1304, whether the indication indicates an acceptance or a rejection of the at least one potential grant of the resources. For example, 1306 may be performed by CU processor 1712, DU processor 1732, RU processor 1742, and/or pre-grant DCI component 199 of FIG. 17. In some aspects, determining whether the indication indicates an acceptance or a rejection of the at least one potential grant of the resources may be based on a configuration of the feedback and/or a default behavior in the absence of feedback as described above. For example, referring to FIGS. 5-11, the TRP (e.g., TRP0 402, 502, 602, 702, 802, 902, 1002, or 1102; or TRP1 1106) may determine (e.g., at 1034, at 1120, or in association with the determination at 1138) if received feedback (e.g., feedback received via feedback resources 530, 580, 680, 730, 780, 830, 861, 871, or 920; acceptance 1014, 1022, or 1114; rejection 1116; or feedback 1134 or 1136) indicates an acceptance or a rejection of the associated pre-grant DCI (e.g., pre-grant DCI 510, 560, 660, 710, 760, 810, 860, 870, or 910) or pre-grant (e.g., pre-grant 1010, 1018, 1028, 1110, 1128, or 1130).

If the network device determines at 1306 that the indication indicates a rejection of the at least one potential grant of the resources, the network device may, at 1308, omit a transmission of at least one of (an indication of) a grant of resources associated with the at least one potential grant of the resources or a DL communication associated with the at least one potential grant of the resources. For example, 1308 may be performed by CU processor 1712. DU processor 1732, RU processor 1742, and/or pre-grant DCI component 199 of FIG. 17. Referring to FIGS. 5-11, for example, the TRP (e.g., TRP0 502, 1002, or 1102; or TRP1 1106) may omit (e.g., at 1034, at 1120, or in association with the determination at 1138) the transmission of a subsequent grant or communication associated with a pre-grant DCI (e.g., pre-grant DCI 510) or pre-grant (e.g., pre-grant 1028 or 1128) for which the TRP has received feedback (e.g., feedback received via feedback resources 530; rejection 1116; or feedback 1134) indicating a rejection of the pre-grant DCI or pre-grant.

If the network device determines at 1306 that the indication indicates an acceptance of the at least one potential grant of the resources, the network device may, at 1310, determine whether to grant resources, and which resources to grant, for a DL communication with the wireless device indicating the acceptance. For example, 1310 may be performed by CU processor 1712, DU processor 1732, RU processor 1742, and/or pre-grant DCI component 199 of FIG. 17. The determination at 1310, in some aspects, may be based on the reception of multiple acceptances or a single acceptance as discussed above. For example, referring to FIGS. 5-11, the TRP (e.g., TRP0 402, 502, 602, 702, 802, 902, 1002, or 1102; or TRP1 1106) may determine, at 1138, whether to transmit a grant and/or a communication to the UE0 1104 or the UE1 1103 based on at least one received feedback (e.g., feedback received via feedback resources 530, 580, 680, 730, 780, 830, 861, 871, or 920; acceptance 1014, 1022, or 1114; rejection 1116; or feedback 1134 or 1136) indicating an acceptance of the associated pre-grant DCI (e.g., pre-grant DCI 510, 560, 660, 710, 760, 810, 860, 870, or 910) or pre-grant (e.g., pre-grant 1010, 1018, 1028, 1110, 1128, or 1130).

For a particular indication of an acceptance, the network device may determine not to transmit a grant or a DL communication and the network device may proceed to omit, at 1308, a transmission of at least one of (an indication of) a grant of resources associated with the at least one potential grant of the resources or a DL communication associated with the at least one potential grant of the resources. Alternatively, or additionally, for one or more indications of an acceptance, the network device may determine to transmit, at 1312, one or more grants, e.g., in a two-DCI pre-grant signaling format, of resources associated with the resources for the DL transmission for one or more of wireless devices of the at least one wireless device and/or one or more DL transmission via the resources indicated in the at least one indication or the one or more grants. For example, 1312 may be performed by CU processor 1712, DU processor 1732, RU processor 1742, and/or pre-grant DCI component 199 of FIG. 17. The one or more grants, in some aspects, may include a second indication indicating a grant of the resources (or a first subset of the resources) for the DL transmission (or a first DL transmission) for a first wireless device of the at least one wireless device and/or a third indication indicating a grant of the resources (or a second subset of the resources) for the DL transmission (or a second DL transmission) for a second wireless device. In some aspects, the one or more grants may be for non-overlapping (or non-conflicting/colliding) subsets of resources included in the potential grant of resources. In some aspects, the second indication is a second DCI including a third set of parameters associated with the grant and the third set of parameters includes parameters associated with one or more of receiving or decoding the DL transmission not included in the first set of parameters. In some aspects, the second DCI may be an independent DCI transmitted before the resources for the DL transmission indicated in the first indication, or a DCI transmitted via the resources indicated in the first indication. In some aspects, the pre-grant DCI (or first DCI) may be one of (1) a different length than the second DCI, (2) a same length as the second DCI based on a padding (e.g., of the first and/or second DCI) but associated with a different RNTI than the second DCI, or (3) the same length as the second DCI based on the padding, wherein the second DCI is associated with a same RNTI as the first DCI and one or both of the first DCI and the second DCI include a set of values for a subset of parameters indicating that the first DCI or the second DCI is associated with pre-grant signaling format. For example, referring to FIGS. 5-11, the TRP (e.g., TRP0 402, 502, 602, 702, 802, 902, 1002, or 1102; or TRP1 1106) may transmit a grant (e.g., grant DCI 563, 763, 813, or 913; piggybacked DCI 663; the set of grant DCIs 863 or 873; or grant 1024, 1118, or 1140) and/or a communication (e.g., communication 1016, 1026, 1122, or 1142) based on a determination (e.g., a determination at 1138).

After omitting the transmission of, or transmitting, at 1308 or 1312, respectively, at least one of (an indication of) a grant of resources associated with the at least one potential grant of the resources or a DL communication associated with the at least one potential grant of the resources, the network device may perform the method again for a subsequent set of resources as described in relation to pre-grants 1110 and pre-grants 1128 and 1130 of FIG. 11.

Figure 14:
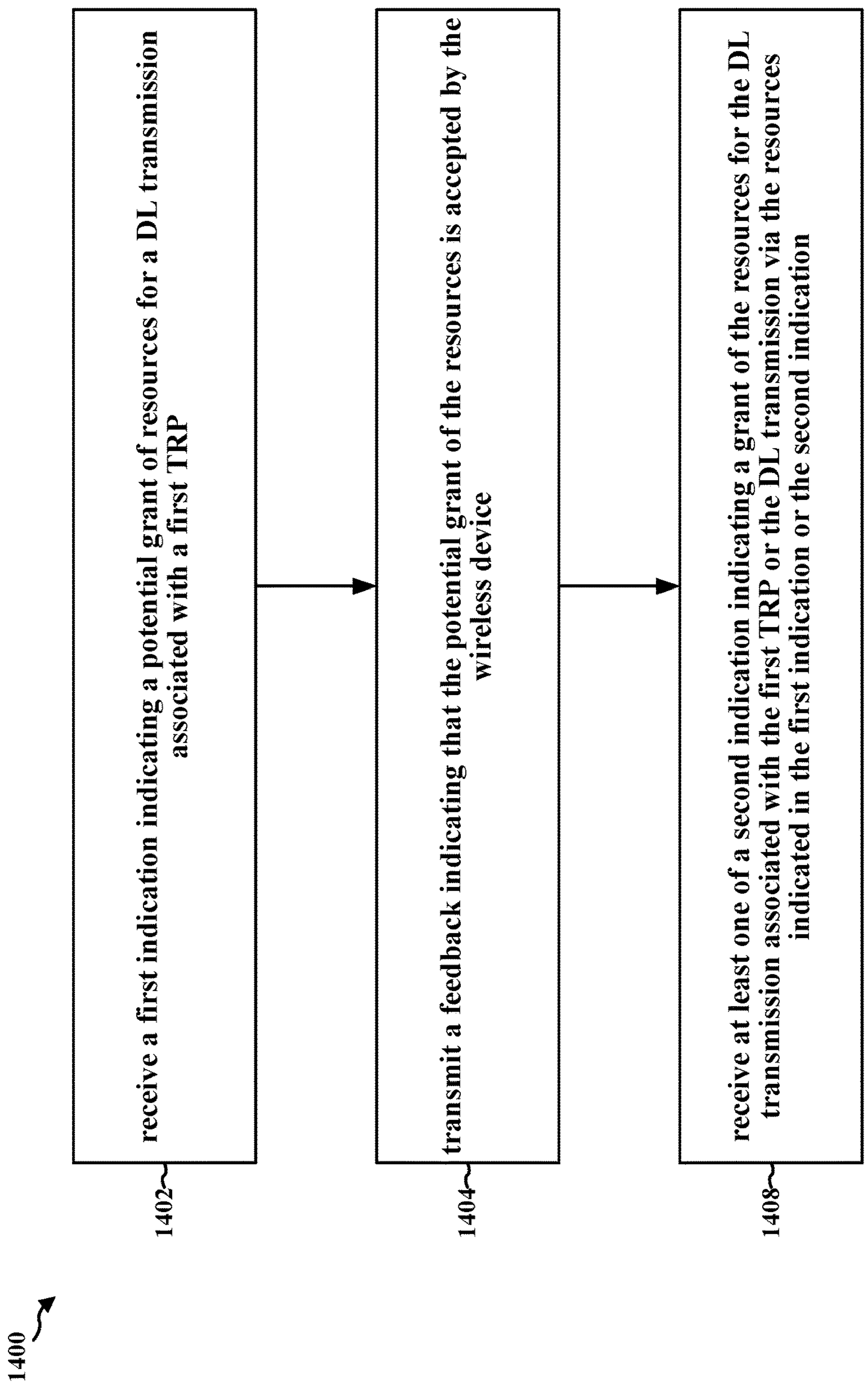
FIG. 14 is a flowchart of a method of wireless communication.

FIG. 14 is a flowchart 1400 of a method of wireless communication. The method may be performed by a UE (e.g., the UE 104, UE 404*b*, UE 504, UE 604, UE 704, UE0 804, UE 904, UE 1004, or UE0 1104; the apparatus 1604). At 1502, the UE (e.g., a UE associated with a first TRP, such as the TRP0 402, 502, 602, 702, 802, 902, 1002, or 1102 and a second TRP such as the TRP1 406, 506, 606, or 1106) may receive a first indication indicating a potential grant of resources for a DL transmission associated with a first TRP. For example, 1402 may be performed by application processor 1606, cellular baseband processor 1624, transceiver(s) 1622, antenna(s) 1680, and/or pre-grant DCI component 198 of FIG. 16. The first indication, in some aspects, may be a first DCI indicating a first set of parameters associated with the potential grant and a second set of parameters associated with the feedback. In some aspects, the first indication may be included in a plurality of indications and the at least one wireless device may include a plurality of wireless devices. In some aspects, the resources indicated in the first indication (or potential grant) follows the first indication by at least a first amount of time and the first amount of time may be at least equal to a second amount of time between the first indication and a feedback resource indicated for the feedback and a third amount of time between the feedback resource and the resources indicated in the potential grant. The third amount of time, in some aspects, may include a fourth amount of time between the feedback resource and a second indication (received at 1408) and a fifth amount of time between the second indication and the resources indicated in the potential grant. For example, referring to FIGS. 5-11, a UE (e.g., the UE 504, 604, 704, 904, or 1004; the UE0 804 or the UE0 1104) may receive at least one pre-grant DCI (e.g., pre-grant DCI 510, 560, 660, 710, 760, 810, 860, 870, or 910) or pre-grant (e.g., pre-grant 1010, 1018, 1028, 1108, 1110, 1118, or 1130) indicating resources (e.g., feedback resources 530, 580, 680, 730, 780, 840, 862, 872, or 920) for feedback (e.g., acceptance 1014, 1022, or 1114; or feedback 1136) and/or resources (e.g., PDSCH resources 515, 565, 665, 715, 765, 815, 865, or 875; or the set of resources 915) for a communication (e.g., communication 1016, 1026, 1122, or 1142).

In some aspects, the first set of parameters may be based on a capability of the wireless device and may include one or more of a slot index (e.g., a K value), a start and length indicator (e.g., a SLIV), a frequency (e.g., an FDRA), a rank, an antenna port assignment, an MCS, a priority associated with the DL transmission, a time to expiration, or a sequence number. In some aspects, the first set of parameters may be used by a wireless device receiving the at least one indication to determine whether one or more other potential grants conflict with the potential grant or to determine which of a set of conflicting potential grants to accept. The first DCI, in some aspects, may be a pre-grant DCI transmitted with information for the wireless device to determine whether the potential grant of resources conflicts with the one or more other potential grants. The second set of parameters associated with the feedback, in some aspects, may include one or more of a time offset between the first indication to the feedback, a priority indicator associated with the feedback, or a DAI.

At 1404, the network device may transmit a feedback indicating that the potential grant of the resources is accepted by the wireless device. For example, 1404 may be performed by application processor 1606, cellular baseband processor 1624, transceiver(s) 1622, antenna(s) 1680, and/or pre-grant DCI component 198 of FIG. 16. The content of the feedback, in some aspects, may be determined by a feedback configuration negotiated between the UE and at the first TRP. For example, referring to FIGS. 5-11, a UE (e.g., the UE 504, 604, 704, 904, or 1004; the UE0 804 or the UE0 1104) may indicate an acceptance (e.g., an acceptance via the feedback resources 540, 580, 680, 730, 780, 840, 862, 872, or 920; acceptance 1014, 1022, or 1114; or feedback 1136) for a pre-grant DCI (e.g., pre-grant DCI 520, 560, 660, 710, 760, 810, 860, 870, or 910) or pre-grant (e.g., pre-grant 1010, 1018, 1110, or 1130).

In response to transmitting the feedback at 1404, the UE may receive, at 1408, at least one of a second indication indicating a grant of the resources for the DL transmission associated with the first TRP, or the DL transmission via the resources indicated in the first indication or the second indication. For example, 1408 may be performed by application processor 1606, cellular baseband processor 1624, transceiver(s) 1622, antenna(s) 1680, and/or pre-grant DCI component 198 of FIG. 16. In some aspects, the second indication is a second DCI including a third set of parameters associated with the grant, and the third set of parameters includes parameters associated with one or more of receiving or decoding the DL transmission not included in the first set of parameters. The resources granted by the second indication, in some aspects, may include a subset of the resources indicated in the first indication. In some aspects, the second DCI may be an independent DCI transmitted before the resources for the DL transmission indicated in the first indication, or a DCI transmitted via the resources indicated in the first indication. In some aspects, the pre-grant DCI (or first DCI) may be one of (1) a different length than the second DCI, (2) a same length as the second DCI based on a padding (e.g., of the first and/or second DCI) but associated with a different RNTI than the second DCI, or (3) the same length as the second DCI based on the padding, wherein the second DCI is associated with a same RNTI as the first DCI and one or both of the first DCI and the second DCI include a set of values for a subset of parameters indicating that the first DCI or the second DCI is associated with pre-grant signaling format. In some aspects, the UE may receive or decode the DL transmission at 1308 based on the third set of parameters. For example, referring to FIGS. 5-11, a UE (e.g., the UE 504, 604, 704, 904, or 1004; the UE0 804 or the UE0 1104) may receive a grant (e.g., grant DCI 563, 763, 813, or 913; piggybacked DCI 663; the set of grant DCIs 863 or 873; or grant 1024, 1118, or 1140) and/or a communication (e.g., communication 1016, 1026, 1122, or 1142) based on the acceptance (e.g., acceptance 1014, 1022, or 1114; or feedback 1134). In some aspects, the UE may receive a third indication indicating an additional potential grant of the resources for an additional DL transmission associated with a second TRP and transmit an additional feedback indicating that the additional potential grant of the resources is rejected by the UE, based on the additional potential grant conflicting with the potential grant indicated in the first indication.

Figure 15:
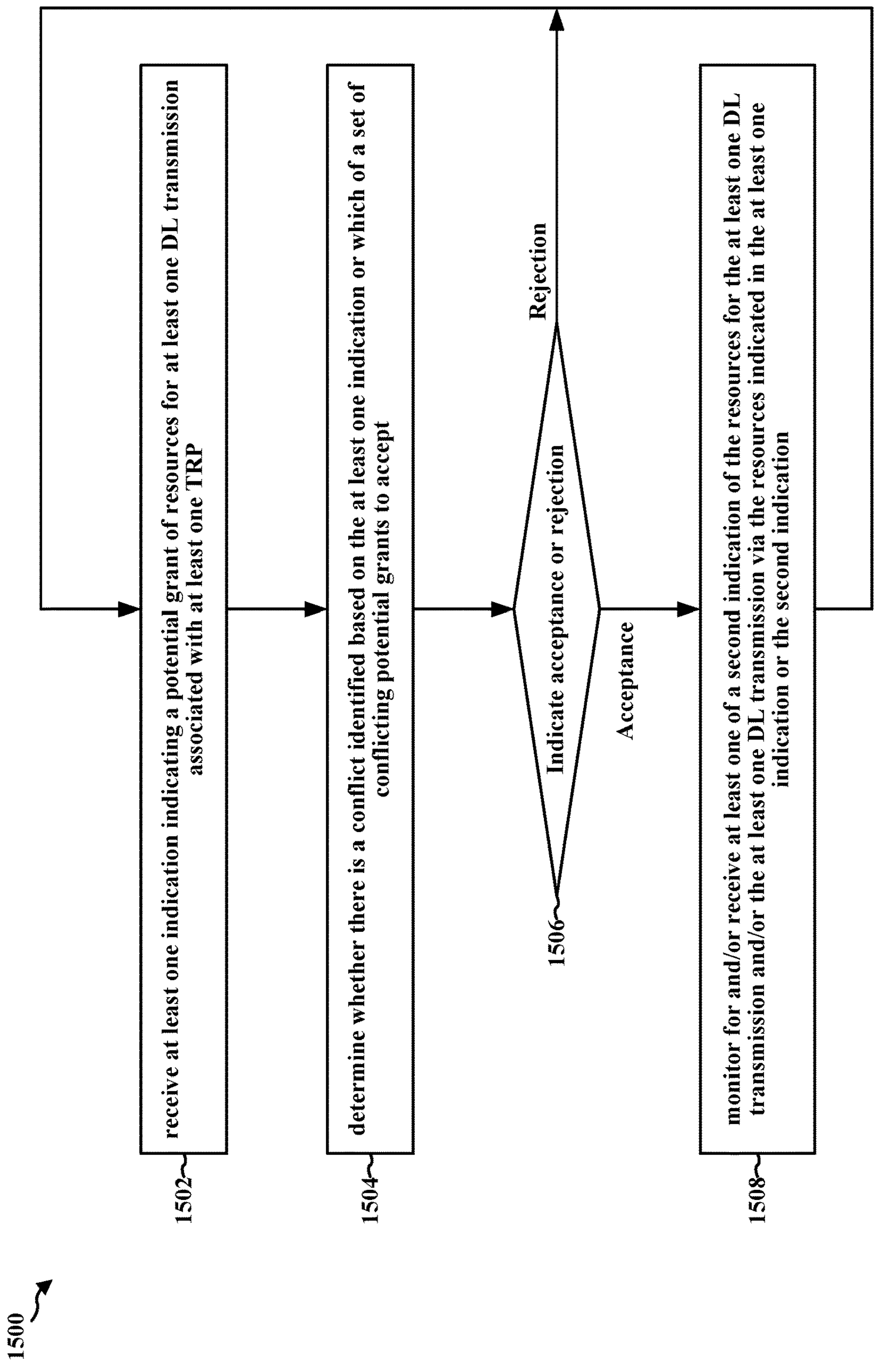
FIG. 15 is a flowchart of a method of wireless communication.

FIG. 15 is a flowchart 1500 of a method of wireless communication. The method may be performed by a UE (e.g., the UE 104, UE 404*b*, UE 504, UE 604, UE 704, UE0 804, UE 904, UE 1004, or UE0 1104; the apparatus 1604). At 1502, the UE (e.g., a UE associated with a first TRP, such as the TRP0 402, 502, 602, 702, 802, 902, 1002, or 1102 and a second TRP such as the TRP1 406, 506, 606, or 1106) may receive at least one indication indicating a potential grant of resources for at least one DL transmission associated with at least one TRP (e.g., a first TRP). For example, 1502 may be performed by application processor 1606, cellular baseband processor 1624, transceiver(s) 1622, antenna(s) 1680, and/or pre-grant DCI component 198 of FIG. 16. The at least one indication, in some aspects, may be a first DCI indicating a first set of parameters associated with the potential grant and a second set of parameters associated with the feedback. The at least one indication and the at least one TRP, in some aspects, may include a plurality of indications and a plurality of TRPs, respectively. In some aspects, the resources indicated in the at least one (or first) indication (or potential grant) follows the at least one (or first) indication by at least a first amount of time and the first amount of time may be at least equal to a second amount of time between the first indication and a feedback resource indicated for the feedback and a third amount of time between the feedback resource and the resources indicated in the potential grant. The third amount of time, in some aspects, may include a fourth amount of time between the feedback resource and a second indication (transmitted at 1508) and a fifth amount of time between the second indication and the resources indicated in the potential grant. For example, referring to FIGS. 5-11, a UE (e.g., the UE 504, 604, 704, 904, or 1004; the UE0 804 or the UE0 1104) may receive at least one pre-grant DCI (e.g., pre-grant DCI 510, 560, 660, 710, 760, 810, 860, 870, or 910) or pre-grant (e.g., pre-grant 1010, 1018, 1028, 1108, 1110, or 1130) indicating resources (e.g., feedback resources 530, 580, 680, 730, 780, 840, 862, 872, or 920) for feedback (e.g., acceptance 1014, 1022, or 1114; or feedback 1136) and/or resources (e.g., PDSCH resources 515, 565, 665, 715, 765, 815, 865, or 875; or the set of resources 915) for a communication (e.g., communication 1016, 1026, 1122, or 1142).

In some aspects, the first set of parameters may be based on a capability of the wireless device and may include one or more of a slot index (e.g., a K value), a start and length indicator (e.g., a SLIV), a frequency (e.g., an FDRA), a rank, an antenna port assignment, an MCS, a priority associated with the DL transmission, a time to expiration, or a sequence number. In some aspects, the first set of parameters may be used by a wireless device receiving the at least one indication to determine whether one or more other potential grants conflict with the potential grant or to determine which of a set of conflicting potential grants to accept. The first DCI, in some aspects, may be a pre-grant DCI transmitted with information for the wireless device to determine whether the potential grant of resources conflicts with the one or more other potential grants. The second set of parameters associated with the feedback, in some aspects, may include one or more of a time offset between the at least one (e.g., the first) indication to the feedback, a priority indicator associated with the feedback, or a DAI.

At 1504, the UE may determine whether there is a conflict identified (or detected) based on the at least one indication or, if a conflict is identified or detected, which of a set of conflicting potential grants to accept. For example, 1504 may be performed by application processor 1606, cellular baseband processor 1624, and/or pre-grant DCI component 198 of FIG. 16. The conflict may be identified based on the resources indicated in the plurality of indications received at 1502 and the capabilities of the UE as described herein. For example, referring to FIGS. 5-11, a UE (e.g., the UE 504, 604, 704, 904, or 1004; the UE0 804 or the UE0 1104) may determine (e.g., at 1012, 1020, 1030, 1112, or 1132) whether to accept a pre-grant DCI (e.g., pre-grant DCI 510, 520, 560, 570, 660, 670, 710, 760, 810, 860, 870, or 910) or pre-grant (e.g., pre-grant 1010, 1018, 1028, 1108, 1110, or 1130) and/or which pre-grant DCI, or pre-grant, to accept (for conflicting pre-grants such as between pre-grant DCIs 510 and 520 or between pre-grants 1108 and 1110).

Based on the determination at 1504, the UE may indicate, at 1506, one of an acceptance or rejection for the at least one indication. For example, 1506 may be performed by application processor 1606, cellular baseband processor 1624, transceiver(s) 1622, antenna(s) 1680, and/or pre-grant DCI component 198 of FIG. 16. The indication of the acceptance or the rejection, in some aspects, may be indicated by transmitting, or skipping a transmission, of a feedback configuration as described above in relation to FIG. 10. In some aspects, an indication of a rejection (e.g., feedback) may indicate a reason for the rejection by the UE. For example, referring to FIGS. 5-11, a UE (e.g., the UE 504, 604, 704, 904, or 1004; the UE0 804 or the UE0 1104) may indicate one of an acceptance or a rejection (e.g., an acceptance or rejection via the feedback resources 530, 580, 680, 730, 780, 840, 862, 872, or 920; acceptance 1014, 1022, or 1114; rejection 1032; or feedback 1136) for a pre-grant DCI (e.g., pre-grant DCI 510, 520, 560, 570, 660, 670, 710, 760, 810, 860, 870, or 910) or pre-grant (e.g., pre-grant 1010, 1018, 1028, 1108, 1110, or 1130). In some aspects, if the UE indicates a rejection at 1506, the UE may return to 1502 to monitor for, or receive, subsequent potential grants that may be accepted or rejected as described for the at least one indication.

If the UE, at 1506, indicates an acceptance, the UE, at 1508, may monitor for, and may receive, at least one of a second indication indicating a grant of the resources for the DL transmission associated with at least one TRP, or the DL transmission via the resources indicated in the (accepted) at least one indication or the second indication. For example, 1508 may be performed by application processor 1606, cellular baseband processor 1624, transceiver(s) 1622, antenna(s) 1680, and/or pre-grant DCI component 198 of FIG. 16. In some aspects, the second indication is a second DCI including a third set of parameters associated with the grant, and the third set of parameters includes parameters associated with one or more of receiving or decoding the DL transmission not included in the first set of parameters. The resources granted by the second indication, in some aspects, may include a subset of the resources indicated in the (accepted) at least one indication. In some aspects, the second DCI may be an independent DCI transmitted before the resources for the DL transmission indicated in the first indication, or a DCI transmitted via the resources indicated in the first indication. In some aspects, the pre-grant DCI (or first DCI) may be one of (1) a different length than the second DCI, (2) a same length as the second DCI based on a padding (e.g., of the first and/or second DCI) but associated with a different RNTI than the second DCI, or (3) the same length as the second DCI based on the padding, wherein the second DCI is associated with a same RNTI as the first DCI and one or both of the first DCI and the second DCI include a set of values for a subset of parameters indicating that the first DCI or the second DCI is associated with pre-grant signaling format.

The UE, in some aspects, may monitor for, but fail to receive, at least one of the second indication indicating the grant of the resources for the DL transmission associated with the at least one TRP, or the DL transmission via the resources indicated in the (accepted) at least one indication or the second indication if the at least one TRP selects a different UE to receive the DL communication. After monitoring for, or receiving, the second indication indicating the grant of the resources for the DL transmission associated with the at least one TRP, or the DL transmission via the resources indicated in the (accepted) at least one indication or the second indication the UE may return to 1502 to monitor for, or receive, subsequent potential grants that may be accepted or rejected as described for the at least one indication. In some aspects, the method may not return to 1502, but may instead be performing the method for multiple potential grants in parallel.

Figure 16:
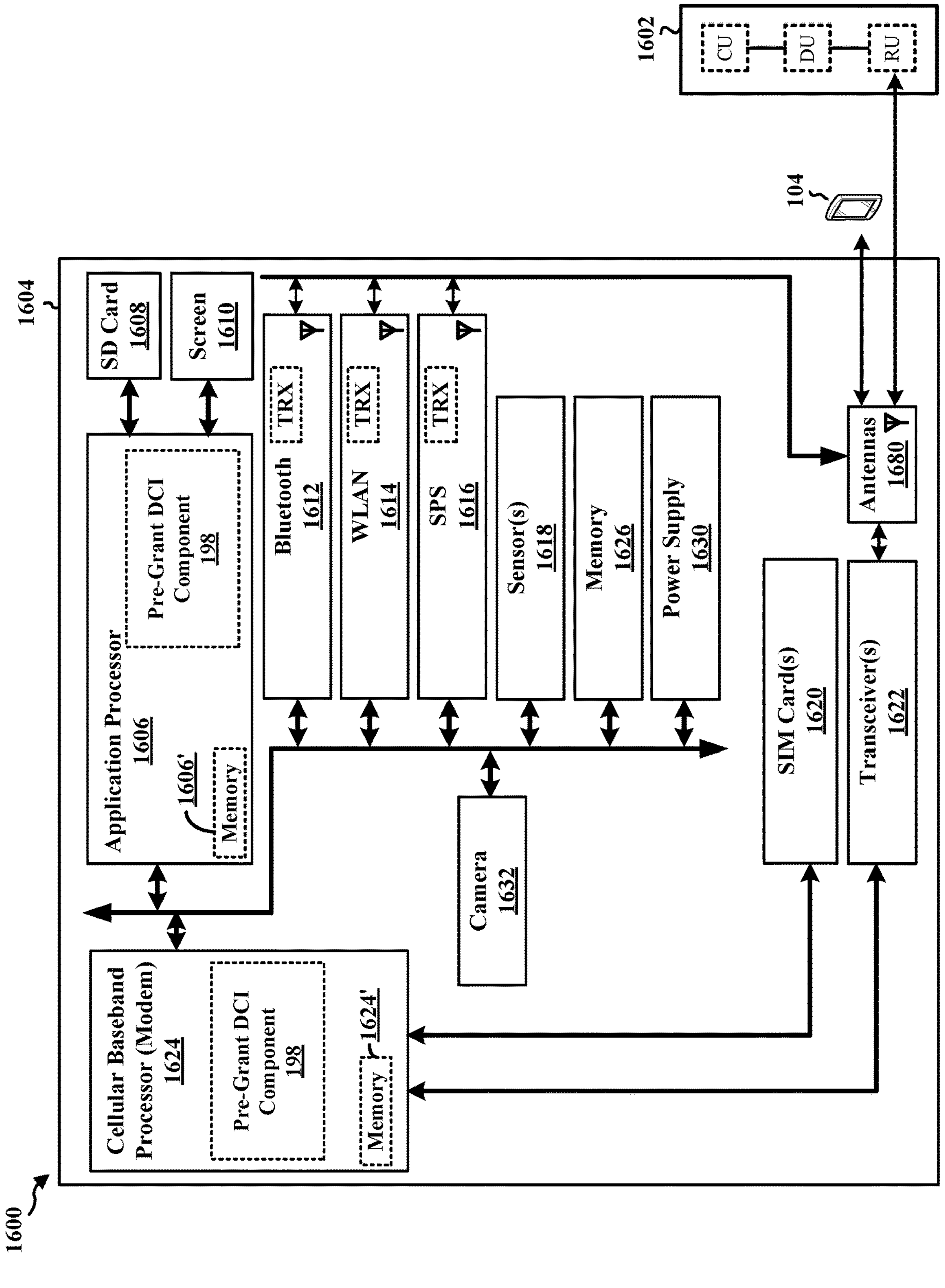
FIG. 16 is a diagram illustrating an example of a hardware implementation for an apparatus.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see UE 350 of FIG. 3) and include the additional modules of the apparatus 1604.

As discussed supra, the pre-grant DCI component 198 may be configured to receive a first indication indicating a potential grant of resources for a DL transmission associated with a first TRP. The pre-grant DCI component 198 may further be configured to transmit a feedback indicating that the potential grant of the resources is accepted by the wireless device. The pre-grant DCI component 198 may also be configured to receive at least one of a second indication indicating a grant of the resources for the DL transmission associated with the first TRP, or the DL transmission via the resources indicated in the first indication or the second indication. The pre-grant DCI component 198 may be within the cellular baseband processor 1624, the application processor 1606, or both the cellular baseband processor 1624 and the application processor 1606. The pre-grant DCI component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, may include means for receiving a first indication indicating a potential grant of resources for a DL transmission associated with a first TRP. The apparatus 1604, and in particular the cellular baseband processor 1624 and/or the application processor 1606, in some aspects, may include means for transmitting a feedback indicating that the potential grant of the resources is accepted by the wireless device. The apparatus 1604, and in particular the cellular baseband processor 1624 and/or the application processor 1606, in some aspects, may include means for receiving at least one of a second indication indicating a grant of the resources for the DL transmission associated with the first TRP or the DL transmission via the resources indicated in the first indication or the second indication. The apparatus 1604, and in particular the cellular baseband processor 1624 and/or the application processor 1606, in some aspects, may include means for determining, based on the first set of parameters, whether one or more other potential grants conflict with the potential grant. The apparatus 1604, and in particular the cellular baseband processor 1624 and/or the application processor 1606, in some aspects, may include means for determining, based on the first set of parameters, which of a set of conflicting potential grants to accept. The apparatus 1604, and in particular the cellular baseband processor 1624 and/or the application processor 1606, in some aspects, may include means for receiving or decoding the DL transmission based on the third set of parameters. The apparatus 1604, and in particular the cellular baseband processor 1624 and/or the application processor 1606, in some aspects, may include means for receiving a third indication indicating an additional potential grant of the resources for an additional DL transmission associated with a second TRP. The apparatus 1604, and in particular the cellular baseband processor 1624 and/or the application processor 1606, in some aspects, may include means for transmitting an additional feedback indicating that the additional potential grant of the resources is rejected by the wireless device, based on the additional potential grant conflicting with the potential grant indicated in the first indication. The means may be the pre-grant DCI component 198 of the apparatus 1604 configured to perform the functions discussed in relation to FIGS. 14 and 15 and recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
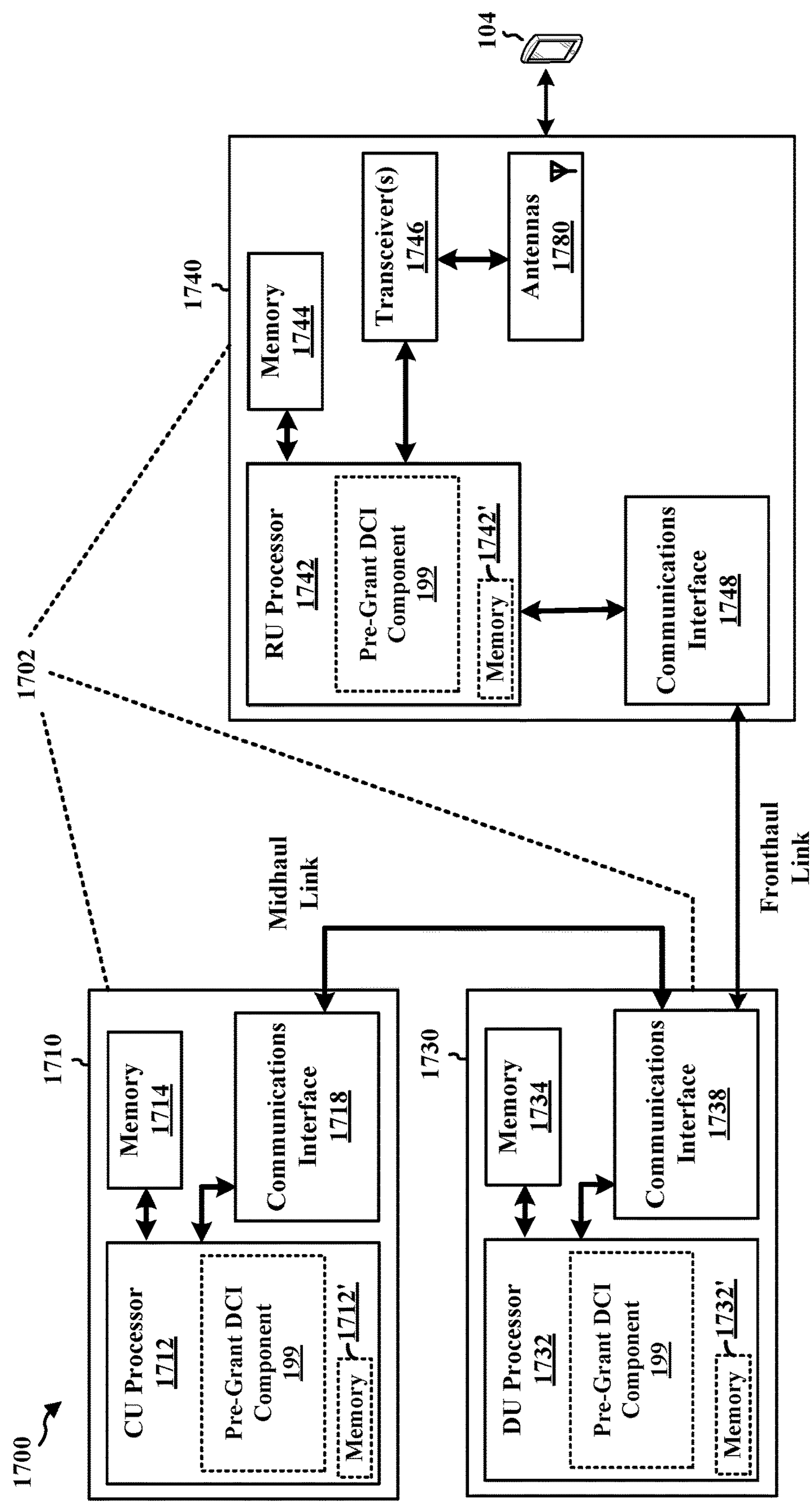
FIG. 17 is a diagram illustrating an example of a hardware implementation for a network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the pre-grant DCI component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the pre-grant DCI component 199 may be configured to transmit a first indication indicating a potential grant of resources for a DL transmission for at least one wireless device. The pre-grant DCI component 199 may further be configured to receive a feedback indicating that the potential grant of the resources is accepted by a wireless device of the at least one wireless device. The pre-grant DCI component 199 may also be configured to transmit at least one of a second indication indicating a grant of the resources for the DL transmission for the wireless device of the at least one wireless device, or the DL transmission via the resources indicated in the first indication or the second indication. The pre-grant DCI component 199 may be within one or more processors of one or more of the CU 1710, DU 1730, and the RU 1740. The pre-grant DCI component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for transmitting a first indication indicating a potential grant of resources for a DL transmission for at least one wireless device. The network entity 1702, in some aspects, may also include means for receiving a feedback indicating that the potential grant of the resources is accepted by a wireless device of the at least one wireless device. The network entity 1702, in some aspects, may also include means for transmitting at least one of a second indication indicating a grant of the resources for the DL transmission for the wireless device of the at least one wireless device, or the DL transmission via the resources indicated in the first indication or the second indication. The network entity 1702, in some aspects, may also include means for transmitting a third indication indicating an additional potential grant of resources for an additional DL transmission for the wireless device. The network entity 1702, in some aspects, may also include means for receiving an additional feedback indicating that the additional potential grant of the resources is rejected by the wireless device. The network entity 1702, in some aspects, may also include means for omitting a transmission of one of the additional DL transmission, or a fourth indication indicating a grant of the resources for the additional DL transmission with the wireless device. The network entity 1702, in some aspects, may also include means for receiving an additional feedback indicating that the potential grant of the resources is accepted by a second wireless device of the at least one wireless device. The network entity 1702, in some aspects, may also include means for at least one of transmitting a fourth indication indicating a grant of a first subset of the resources for a first DL transmission for the second wireless device, transmitting a fifth indication indicating no grant of the resources for the first DL transmission, or omitting the transmission of at least one of the fourth indication or the fifth indication. The means may be the pre-grant DCI component 199 of the network entity 1702 configured to perform the functions discussed in relation to FIGS. 12 and 13 and recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

In some aspects of wireless communication, e.g., 5G NR, multiple TRPs may communicate with a single wireless device and/or a single wireless device may communicate with multiple TRPs. There is the potential for overlap in time, frequency, spatial direction, etc. for communication with multiple TRPs. In some aspects, mTRP communication may be scheduled with a single DCI (sDCI) transmitted by one of the TRPs. In some aspects, the mTRP communication may be scheduled by mDCI, e.g., from the different TRPs. Thus, control and/or data signaling from the TRPs may overlap in time, frequency, and/or spatial directions. For the sDCI example, one or more of SDM, FDM, or TDM may be employed for the PDSCHs from different TRPs. For the mDCI example, HARQ ACK/NACK feedback for the different TRPs may be based on a single codebook or may be based on different codebooks. In some aspects, PDCCH from multiple TRPs may be transmitted with repetition having different QCL relationships. In some aspect, PUSCH or PUCCH may be transmitted to multiple TRPs in a TDM manner with repetition, or may be simultaneously transmitted with SDM.

In some aspects, multiple TRPs connected to a particular UE may not cooperate and/or coordinate (e.g., in real-time and/or via fast backhaul signaling) to schedule individual communications. The lack of cooperation and/or coordination may lead to "collisions" between communications for the different TRPs such that one or both of the colliding communications cannot be completed (e.g., transmitted, received, decoded, and/or encoded) leading to wasted resources as described below in relation to FIGS. 4A-6. For example, a same set of resources (or overlapping resources in one or more of frequency and/or time) may be allocated and/or granted for communication with a particular UE (or other wireless device) by two TRPs that does not support both communications (e.g., the overlap is such that the UE is incapable of transmitting and/or receiving both communications or of decoding and/or encoding both communications).

In some aspects, a per-cell operation of TRPs (e.g., base stations, eNBs, gNBs, etc.) that does not rely on cooperation and/or coordination to serve UEs may be assumed as a current state or configuration of a network or network entities in the network. For example, each TRP may have an independent scheduler. The network, in some aspects, may have mTRP-capable UEs introduced which may be served with currently-deployed TRPs (e.g., base stations, eNBs, gNBs, etc.) without substantial change to the network (e.g., the network entities or network components such as the TRPs, base stations, etc.). For example, while some software upgrades for one or more TRPs may be implemented, in some aspects, fast backhaul signaling between TRPs may not be implemented. To support mTRP-capable UEs with the minimal changes (e.g., software upgrades) discussed above, in some aspects, a method and apparatus are provided that introduce (e.g., transmit from a TRP or receive at a UE) a pre-grant indication of resources that may be subsequently granted, or used, for a communication to reduce collisions and wasted resources for non-cooperating and/or non-coordinating TRPs. The method and apparatus, in some aspects, may be easier to deploy as it does not rely on tight coordination. Aspects presented herein provide a type of unified mTRP framework for communication systems including multiple TRPs. Additionally, as the aspects enable independent TRP operation, e.g., without a certain level of coordination, the method and apparatus may be extended to active set management with different cells such that each TRP is packaged into an active set member and enables each active set to operate with its own TCI states, RS, CORESET, etc.

The method and apparatus, in some aspects, may be associated with a TRP in a mTRP architecture and may transmit a first indication indicating a potential grant of resources for a DL transmission for one or more wireless devices and receive a feedback indicating that the potential grant of the resources is accepted by a wireless device of the one or more wireless devices. The method and apparatus may also transmit at least one of a second indication indicating a grant of the resources for the DL transmission for the wireless device of the one or more wireless devices, or the DL transmission via the resources indicated in the first indication or the second indication.

In some aspects, the method and apparatus, in some aspects, may be associated with a wireless device in a mTRP architecture (e.g., connected to a plurality of TRPs) and may receive a first indication indicating a potential grant of resources for a DL transmission associated with a first TRP and transmit a feedback indicating that the potential grant of the resources is accepted by the wireless device. The method and apparatus may also receive at least one of a second indication indicating a grant of the resources for the DL transmission associated with the first TRP, or the DL transmission via the resources indicated in the first indication or the second indication. Accordingly, the method and apparatus reduce the effect of collisions while introducing a minimal amount of additional cooperation and/or coordination between independent TRPs and a minimal amount of additional signaling overhead. In some aspects, the method and apparatus may additionally increase throughput in the absence of collisions to offset the additional signaling in the case of collisions (e.g., collisions that have not been averted or avoided by the method and apparatus as will be described below).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network device associated with a first TRP, including transmitting a first indication indicating a potential grant of resources for a DL transmission for at least one wireless device, receiving a feedback indicating that the potential grant of the resources is accepted by a wireless device of the at least one wireless device, and transmitting at least one of a second indication indicating a grant of the resources for the DL transmission for the wireless device of the at least one wireless device or the DL transmission via the resources indicated in the first indication or the second indication.

Aspect 2 is the method of aspect 1, where the first indication is a first DCI indicating a first set of parameters associated with the potential grant and a second set of parameters associated with the feedback.

Aspect 3 is the method of aspect 2, where the second set of parameters associated with the feedback include one or more of a time offset between the first indication to the feedback, a priority indicator associated with the feedback, or a DAI.

Aspect 4 is the method of any of aspects 2 and 3, where the first set of parameters is based on a capability of the wireless device and includes one or more of a slot index, a start and length indicator, a frequency domain resource assignment, a rank, an antenna port assignment, a modulation and coding scheme, a priority associated with the DL transmission, a time to expiration, or a sequence number, and where the first set of parameters is used to determine whether one or more other potential grants conflict with the potential grant or to determine which of a set of conflicting potential grants to accept.

Aspect 5 is the method of aspect 4, where the first DCI is a pre-grant DCI transmitted with information for the wireless device to determine whether the potential grant of resources conflicts with the one or more other potential grants, where the second indication is a second DCI including a third set of parameters associated with the grant, and where the third set of parameters includes parameters associated with one or more of receiving or decoding the DL transmission not included in the first set of parameters.

Aspect 6 is the method of aspect 5, where the second DCI is one of an independent DCI transmitted before the resources indicated in the first indication, or transmitted via the resources indicated in the first indication.

Aspect 7 is the method of any of aspects 5 and 6, where the pre-grant DCI is one of a different length than the second DCI, a same length as the second DCI based on a padding, where the second DCI is associated with a different RNTI than the first DCI, or the same length as the second DCI based on the padding, where the second DCI is associated with a same RNTI as the first DCI and the first DCI includes a set of values for a subset of parameters indicating that the first DCI is a pre-grant.

Aspect 8 is the method of any of aspects 1 to 7, where the resources indicated in the potential grant follows the first indication by at least a first amount of time, where the first amount of time is at least equal to a second amount of time between the first indication and a feedback resource indicated for the feedback and a third amount of time between the feedback resource and the resources indicated in the potential grant.

Aspect 9 is the method of aspect 8, where the third amount of time includes a fourth amount of time between the feedback resource and the second indication and a fifth amount of time between the second indication and the resources indicated in the potential grant.

Aspect 10 is the method of any of aspects 1 to 9, further including transmitting a third indication indicating an additional potential grant of resources for an additional DL transmission for the wireless device, receiving an additional feedback indicating that the additional potential grant of the resources is rejected by the wireless device, and omitting a transmission of one of the additional DL transmission or a fourth indication indicating an additional grant of the resources for the additional DL transmission with the wireless device.

Aspect 11 is the method of aspect 10, where the additional feedback indicates a reason for the additional feedback indicating that the additional potential grant of the resources is rejected by the wireless device.

Aspect 12 is the method of any of aspects 1 to 10, where the at least one wireless device includes a plurality of wireless devices and transmitting the first indication includes transmitting the first indication to the plurality of wireless devices, where the wireless device of the at least one wireless device is a first wireless device, the method further including receiving an additional feedback indicating that the potential grant of the resources is accepted by a second wireless device of the at least one wireless device, and at least one of transmitting a fourth indication indicating an additional grant of a first subset of the resources for a first DL transmission for the second wireless device, where the resources granted by the second indication include a second subset of the resources that excludes the first subset of the resources, transmitting a fifth indication indicating no grant of the resources for the first DL transmission, or omitting sending at least one of the fourth indication or the fifth indication.

Aspect 13 is a method of wireless communication at a wireless device, the method including receiving a first indication indicating a potential grant of resources for a DL transmission associated with a first TRP, transmitting a feedback indicating that the potential grant of the resources is accepted by the wireless device, and receiving at least one of a second indication indicating a grant of the resources for the DL transmission associated with the first TRP or the DL transmission via the resources indicated in the first indication or the second indication.

Aspect 14 is the method of aspect 13, where the first indication is a first DCI indicating a first set of parameters associated with the potential grant and a second set of parameters associated with the feedback.

Aspect 15 is the method of aspect 14, where the second set of parameters associated with the feedback include one or more of a time offset between the first indication to the feedback, a priority indicator associated with the feedback, or a DAI.

Aspect 16 is the method of any of aspects 14 and 15, where the first set of parameters is based on a capability of the wireless device and includes one or more of a slot index, a start and length indicator, a frequency domain resource assignment, a rank, an antenna port assignment, a modulation and coding scheme, a priority associated with the DL transmission, a time to expiration, or a sequence number, the method further including at least one of determining, based on the first set of parameters, whether one or more other potential grants conflict with the potential grant or determining, based on the first set of parameters, which of a set of conflicting potential grants to accept.

Aspect 17 is the method of aspect 16, where the first DCI is a pre-grant DCI, where the second indication is a second DCI including a third set of parameters associated with the grant, and where the third set of parameters includes parameters not included in the first set of parameters, the method further including at least one of receiving or decoding the DL transmission based on the third set of parameters.

Aspect 18 is the method of aspect 17, where the second DCI is one of an independent DCI received before the resources indicated in the first indication, or received via the resources indicated in the first indication.

Aspect 19 is the method of any of aspects 17 and 18, where the pre-grant DCI is one of a different length than the second DCI, a same length as the second DCI based on a padding, where the second DCI is associated with a different RNTI than the first DCI, or the same length as the second DCI based on the padding, where the second DCI is associated with a same RNTI as the first DCI and the first DCI includes a set of values for a subset of parameters indicating that the first DCI is a pre-grant.

Aspect 20 is the method of any of aspects 13 to 19, further including receiving a third indication indicating an additional potential grant of the resources for an additional DL transmission associated with a second TRP and transmitting an additional feedback indicating that the additional potential grant of the resources is rejected by the wireless device, based on the additional potential grant conflicting with the potential grant indicated in the first indication.

Aspect 21 is the method of aspect 20, where the additional feedback indicates a reason for the additional feedback indicating that the additional potential grant of the resources is rejected by the wireless device.

Aspect 22 is the method of any of aspects 13 to 21, where the resources granted by the second indication include a subset of the resources.

Aspect 23 is an apparatus for wireless communication at a device including a memory and at least one processor coupled to the memory and, based at least in part on information stored in the memory, the at least one processor is configured to implement any of aspects 1 to 22.

Aspect 24 is the method of aspect 23, further including a transceiver or an antenna coupled to the at least one processor.

Aspect 25 is an apparatus for wireless communication at a device including means for implementing any of aspects 1 to 22.

Aspect 26 is a computer-readable medium (e.g., a non-transitory computer-readable medium) storing computer executable code, where the code when executed by a processor causes the processor to implement any of aspects 1 to 22.

What is claimed is:

1. An apparatus for wireless communication at a first network device associated with a first transmission and reception point (TRP), comprising:

memory; and at least one processor coupled to the memory and, based at least in part on stored information that is stored in the memory, the at least one processor is configured to:

transmit a first indication indicating a potential grant of resources for a downlink (DL) transmission for at least one wireless device, wherein the first indication comprises a first set of parameters associated with the potential grant of the resources, and wherein the first set of parameters allows the at least one wireless device to determine at least one of (i) that no other potential grants received by the at least one wireless device conflict with the potential grant of the resources or (ii) that there is at least one additional potential grant received by the at least one wireless device that conflicts with the potential grant and which of the potential grant or the at least one additional potential grant to accept;

receive a feedback that indicates that the potential grant of the resources is accepted by a wireless device of the at least one wireless device; and transmit at least one of:

a second indication that indicates a grant of the resources for the DL transmission for the wireless device of the at least one wireless device, or the DL transmission via the resources indicated in the first indication or the second indication.

2. The apparatus of claim 1, wherein the first indication is a first downlink control information (DCI) that indicates the first set of parameters associated with the potential grant and a second set of parameters associated with the feedback.

3. The apparatus of claim 2, wherein the second set of parameters associated with the feedback comprise one or more of a time offset between the first indication to the feedback, a priority indicator associated with the feedback, or a downlink assignment indicator (DAI).

4. The apparatus of claim 1, wherein the first set of parameters is based on a capability of the wireless device and comprises one or more of a slot index, a start and length indicator, a frequency domain resource assignment, a rank, an antenna port assignment, a modulation and coding scheme, a priority associated with the DL transmission, a time to expiration, or a sequence number.

5. The apparatus of claim 4, wherein the at least one processor is configured to transmit the second indication, wherein the first indication is a pre-grant downlink control information (DCI), wherein the second indication is a second DCI that includes a third set of parameters associated with the grant, wherein the third set of parameters includes parameters not included in the first set of parameters, and wherein the third set of parameters are associated with one or more of receiving or decoding the DL transmission.

6. The apparatus of claim 5, wherein the second DCI is one of:
an independent DCI transmitted before the resources indicated in the first indication, or
transmitted via the resources indicated in the first indication.

7. The apparatus of claim 5, wherein the pre-grant DCI is one of:
a different length than the second DCI;
a same length as the second DCI based on a padding, wherein the second DCI is associated with a different radio network temporary identifier (RNTI) than the first DCI; or
the same length as the second DCI based on the padding, wherein the second DCI is associated with a same RNTI as the first DCI and the first DCI includes a set of values for a subset of parameters indicating that the first DCI is a pre-grant.

8. The apparatus of claim 1, wherein the resources indicated in the potential grant follows the first indication by at least a first amount of time, wherein the first amount of time is at least equal to a second amount of time between the first indication and a feedback resource indicated for the feedback and a third amount of time between the feedback resource and the resources indicated in the potential grant.

9. The apparatus of claim 8, wherein the at least one processor is configured to transmit the second indication, and wherein the third amount of time comprises a fourth amount of time between the feedback resource and the second indication and a fifth amount of time between the second indication and the resources indicated in the potential grant.

10. The apparatus of claim 1, wherein the at least one processor is further configured to:
transmit a third indication that indicates an additional potential grant of resources for an additional DL transmission for the wireless device;
receive an additional feedback that indicates that the additional potential grant of the resources is rejected by the wireless device; and
omit a transmission of one of:
the additional DL transmission, or
a fourth indication that indicates an additional grant of the resources for the additional DL transmission with the wireless device.

11. The apparatus of claim 10, wherein the additional feedback indicates a reason for the additional feedback indicating that the additional potential grant of the resources is rejected by the wireless device.

12. The apparatus of claim 1, wherein the at least one wireless device comprises a plurality of wireless devices and the at least one processor is configured to transmit the first indication by being configured to transmit the first indication to the plurality of wireless devices, wherein the wireless device of the at least one wireless device is a first wireless device, and wherein the at least one processor is further configured to:
receive an additional feedback that indicates that the potential grant of the resources is accepted by a second wireless device of the at least one wireless device; and
at least one of:
transmit a fourth indication that indicates an additional grant of a first subset of the resources for a first DL transmission for the second wireless device, wherein the at least one processor is configured to transmit the second indication, and wherein the resources granted by the second indication comprise a second subset of the resources that excludes the first subset of the resources,
transmit a fifth indication that indicates no grant of the resources for the first DL transmission, or
omit sending at least one of the fourth indication or the fifth indication.

13. An apparatus for wireless communication at a wireless device, comprising:
memory; and
at least one processor coupled to the memory and, based at least in part on information stored in the memory, the at least one processor is configured to:
receive a first indication that indicates a potential grant of resources for a downlink (DL) transmission associated with a first transmission and reception point (TRP), wherein the first indication comprises a first set of parameters associated with the potential grant of the resources;
determine, based on the first set of parameters, at least one of (i) that no other potential grants received by the wireless device conflict with the potential grant of the resources or (ii) that there is at least one additional potential grant received by the wireless device that conflicts with the potential grant and which of the potential grant or the at least one additional potential grant to accept;
transmit, based on a first determination that no other potential grants conflict with the potential grant of the resources or a second determination to accept the potential grant, a feedback that indicates that the potential grant of the resources is accepted by the wireless device; and
receive at least one of:
a second indication that indicates a grant of the resources for the DL transmission associated with the first TRP, or
the DL transmission via the resources indicated in the first indication or the second indication.

14. The apparatus of claim 13, wherein the first indication is a first downlink control information (DCI) that indicates the first set of parameters associated with the potential grant and a second set of parameters associated with the feedback.

15. The apparatus of claim 14, wherein the second set of parameters associated with the feedback comprise one or more of a time offset between the first indication to the feedback, a priority indicator associated with the feedback, or a downlink assignment indicator (DAI).

16. The apparatus of claim 13, wherein the first set of parameters is based on a capability of the wireless device and comprises one or more of a slot index, a start and length indicator, a frequency domain resource assignment, a rank, an antenna port assignment, a modulation and coding scheme, a priority associated with the DL transmission, a time to expiration, or a sequence number, and wherein to determine at least one of (i) that no other potential grants received by the wireless device conflict with the potential grant of the resources or (ii) that there is at least one additional potential grant received by the wireless device that conflicts with the potential grant and which of the potential grant or the at least one additional potential grant to accept, the at least one processor is configured to at least one of:

determine, based on the first set of parameters, that the potential grant of the resources does not conflict with the one or more other potential grants; or determine, based on the first set of parameters, to accept the potential grant of the resources from a plurality of conflicting potential grants comprising the potential grant and the at least one additional potential grant.

17. The apparatus of claim 16, wherein the at least one processor is configured to receive the second indication, wherein the first indication is a pre-grant downlink control information (DCI), wherein the second indication is a second DCI that includes a third set of parameters associated with the grant, and wherein the third set of parameters includes parameters not included in the first set of parameters, and wherein the at least one processor is further configured to:

receive or decode the DL transmission based on the third set of parameters.

18. The apparatus of claim 17, wherein the second DCI is one of:

an independent DCI received before the resources indicated in the first indication, or received via the resources indicated in the first indication.

19. The apparatus of claim 17, wherein the pre-grant DCI is one of:

a different length than the second DCI;

a same length as the second DCI based on a padding, wherein the second DCI is associated with a different radio network temporary identifier (RNTI) than the first DCI; or the same length as the second DCI based on the padding, wherein the second DCI is associated with a same RNTI as the first DCI and the first DCI includes a set of values for a subset of parameters indicating that the first DCI is a pre-grant.

20. The apparatus of claim 13, wherein the at least one processor is configured to receive the second indication, and wherein the at least one processor is further configured to:

receive a third indication that indicates an additional potential grant of the resources for an additional DL transmission associated with a second TRP; and transmit an additional feedback that indicates that the additional potential grant of the resources is rejected by the wireless device, based on the additional potential grant conflicting with the potential grant indicated in the first indication.

21. The apparatus of claim 20, wherein the additional feedback indicates a reason for the additional feedback indicating that the additional potential grant of the resources is rejected by the wireless device.

22. The apparatus of claim 13, wherein the at least one processor is configured to receive the second indication, and wherein the resources granted by the second indication comprise a subset of the resources.

23. A method for wireless communication at a first transmission and reception point (TRP), the method comprising:

transmitting a first indication indicating a potential grant of resources for a downlink (DL) transmission for at least one wireless device, wherein the first indication comprises a first set of parameters associated with the potential grant of the resources, and wherein the first set of parameters allows the at least one wireless device to determine at least one of (i) that no other potential grants received by the at least one wireless device conflict with the potential grant of the resources or (ii) that there is at least one additional potential grant received by the at least one wireless device that conflicts with the potential grant and which of the potential grant or the at least one additional potential grant to accept;

receiving a feedback indicating that the potential grant of the resources is accepted by a wireless device of the at least one wireless device; and transmitting at least one of:

a second indication indicating a grant of the resources for the DL transmission for the wireless device of the at least one wireless device, or the DL transmission via the resources indicated in the first indication or the second indication.

24. The method of claim 23, wherein the first indication is a first downlink control information (DCI) indicating the first set of parameters associated with the potential grant and a second set of parameters associated with the feedback, wherein the first set of parameters is based on a capability of the wireless device and comprises one or more of a slot index, a start and length indicator, a frequency domain resource assignment, a rank, an antenna port assignment, a modulation and coding scheme, a priority associated with the DL transmission, a time to expiration, or a sequence number, and wherein the second set of parameters associated with the feedback comprise one or more of a time offset between the first indication to the feedback, a priority indicator associated with the feedback, or a downlink assignment indicator (DAI).

25. The method of claim 23, further comprising:

transmitting a third indication indicating an additional potential grant of resources for an additional DL transmission for the wireless device;

receiving an additional feedback indicating that the additional potential grant of the resources is rejected by the wireless device; and omitting a transmission of one of:

the additional DL transmission, or a fourth indication indicating an additional grant of the resources for the additional DL transmission with the wireless device.

26. The method of claim 23, wherein the at least one wireless device comprises a plurality of wireless devices and transmitting the first indication comprises transmitting the first indication to the plurality of wireless devices, wherein the wireless device of the at least one wireless device is a first wireless device, the method further comprising:

receiving an additional feedback indicating that the potential grant of the resources is accepted by a second wireless device of the at least one wireless device; and at least one of:

transmitting a fourth indication indicating an additional grant of a first subset of the resources for a first DL transmission for the second wireless device, wherein the method comprises transmitting the second indication, and wherein the resources granted by the second indication comprise a second subset of the resources that excludes the first subset of the resources, transmitting a fifth indication indicating no grant of the resources for the first DL transmission, or omitting sending at least one of the fourth indication or the fifth indication.

27. A method for wireless communication at a wireless device, comprising:

receiving a first indication indicating a potential grant of resources for a downlink (DL) transmission associated with a first transmission and reception point (TRP), wherein the first indication comprises a first set of parameters associated with the potential grant of the resources;

determining, based on the first set of parameters, at least one of (i) that no other potential grants received by the wireless device conflict with the potential grant of the resources or (ii) that there is at least one additional potential grant received by the wireless device that conflicts with the potential grant and which of the potential grant or the at least one additional potential grant to accept;

transmitting, based on a first determination that no other potential grants conflict with the potential grant of the resources or a second determination to accept the potential grant, a feedback indicating that the potential grant of the resources is accepted by the wireless device; and receiving at least one of:

a second indication indicating a grant of the resources for the DL transmission associated with the first TRP, or the DL transmission via the resources indicated in the first indication or the second indication.

28. The method of claim 27, wherein the first indication is a first downlink control information (DCI) indicating the first set of parameters associated with the potential grant and a second set of parameters associated with the feedback, wherein the first set of parameters is based on a capability of the wireless device and comprises one or more of a slot index, a start and length indicator, a frequency domain resource assignment, a rank, an antenna port assignment, a modulation and coding scheme, a priority associated with the DL transmission, a time to expiration, or a sequence number, and wherein the second set of parameters associated with the feedback comprise one or more of a time offset between the first indication to the feedback, a priority indicator associated with the feedback, or a downlink assignment indicator (DAI), and wherein determining at least one of (i) that no other potential grants received by the wireless device conflict with the potential grant of the resources or (ii) that there is at least one additional potential grant received by the wireless device that conflicts with the potential grant and which of the potential grant or the at least one additional potential grant to accept comprises at least one of:

determining, based on the first set of parameters, that the potential grant of the resources does not conflict with the one or more other potential grants; or determining, based on the first set of parameters, to accept the potential grant of the resources from a plurality of conflicting potential grants comprising the potential grant and the at least one additional potential grant.

29. The method of claim 27, further comprising:

receiving a third indication indicating an additional potential grant of the resources for an additional DL transmission associated with a second TRP; and transmitting an additional feedback indicating that the additional potential grant of the resources is rejected by the wireless device, based on the additional potential grant conflicting with the potential grant indicated in the first indication.

30. The method of claim 27, comprising receiving the second indication, wherein the resources granted by the second indication comprise a subset of the resources.

* * * * *